United States Patent
Rahman et al.

(10) Patent No.: US 10,015,820 B2
(45) Date of Patent: Jul. 3, 2018

(54) METHODS AND APPARATUSES FOR CELL CONFIGURATION

(71) Applicant: TELEFONAKTIEBOLAGET L M ERICSSON (PUBL), Stockholm (SE)

(72) Inventors: Imadur Rahman, Sollentuna (SE); Joakim Axmon, Kävlinge (SE); Muhammad Kazmi, Bromma (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 263 days.

(21) Appl. No.: 14/781,230

(22) PCT Filed: Aug. 4, 2015

(86) PCT No.: PCT/SE2015/050844
§ 371 (c)(1),
(2) Date: Sep. 29, 2015

(87) PCT Pub. No.: WO2016/024900
PCT Pub. Date: Feb. 18, 2016

(65) Prior Publication Data
US 2016/0262180 A1 Sep. 8, 2016

Related U.S. Application Data

(60) Provisional application No. 62/035,534, filed on Aug. 11, 2014.

(51) Int. Cl.
*H04W 74/00* (2009.01)
*H04L 5/00* (2006.01)
(Continued)

(52) U.S. Cl.
CPC ......... *H04W 74/008* (2013.01); *H04L 5/0005* (2013.01); *H04L 5/22* (2013.01);
(Continued)

(58) Field of Classification Search
CPC ... H04W 74/008; H04W 88/02; H04W 88/06; H04W 88/08; H04W 84/042; H04L 5/0005; H04L 5/22
See application file for complete search history.

(56) References Cited

U.S. PATENT DOCUMENTS 8,542,654 B1  9/2013  Dinan
9,491,780 B2* 11/2016  Pang ................ H04W 74/0833
(Continued)

FOREIGN PATENT DOCUMENTS

RU  2 502 192 C1  12/2013
WO  2013070029 A1  5/2013

OTHER PUBLICATIONS

International Search Report and the Written Opinion of the International Searching Authority, issued in corresponding International Application No. PCT/SE2015/050844, dated Nov. 16, 2015, 13 pages.
(Continued)

*Primary Examiner* — Hoang-Chuong Q Vu
(74) *Attorney, Agent, or Firm* — Rothwell, Figg, Ernst & Manbeck, p.c.

(57) ABSTRACT

A wireless device (120) and method for performing cell configuration. The wireless device and a first network node (111) serving the wireless device are operating in a wireless communications network (100), wherein the first network node manages a first serving cell (111a). When the wireless device is to send a second Random Access (RA) transmission in the first serving cell to the first network node while preparing to perform or performing configuration of a second serving cell managed by a second network node, the wireless device configures the second serving cell using a configuration time delay $T_{act\_PSCell}$ comprising at least a time delay $T_{RA\_PCell}$ due to the second RA transmission, otherwise the wireless device configures the second serving cell using the configuration time delay $T_{act\_PSCell}$ excluding the time delay $T_{RA\_PCell}$ due to the second RA transmission.

29 Claims, 14 Drawing Sheets

(51) Int. Cl.
 *H04L 5/22*  (2006.01)
 *H04W 88/06*  (2009.01)
 *H04W 84/04*  (2009.01)
 *H04W 88/02*  (2009.01)
 *H04W 88/08*  (2009.01)

(52) U.S. Cl.
 CPC .......... *H04W 84/042* (2013.01); *H04W 88/02* (2013.01); *H04W 88/06* (2013.01); *H04W 88/08* (2013.01)

(56) References Cited

U.S. PATENT DOCUMENTS

| | | |
|---|---|---|
| 2013/0250911 A1 | 9/2013 | Kwon et al. |
| 2013/0265991 A1 | 10/2013 | Dinan |
| 2013/0343345 A1* | 12/2013 | Dinan ................... H04W 36/30 370/332 |
| 2015/0305011 A1* | 10/2015 | Bergstrom ........ H04W 72/0453 370/329 |
| 2015/0382345 A1* | 12/2015 | Yamada ................ H04L 1/0618 370/329 |
| 2016/0295613 A1* | 10/2016 | Wager ................. H04L 41/0813 |
| 2017/0142620 A1* | 5/2017 | Rune ................. H04W 36/0072 |
| 2017/0257892 A1* | 9/2017 | Wan ................. H04W 74/0833 |

OTHER PUBLICATIONS

Intel Corporation "Random access procedure for dual connectivity" 3GPP TSG RAN WG2 Meeting #84, R2-134273, 2013, 3 pages.
Russian Office Action with English Translation, issued in corresponding Application No. 2017107519/07 (012998), dated Mar. 6, 2018, 19 pages.

* cited by examiner

Figure 10 Method performed by the wireless device 120

Figure 11 Method in UE 120

Figure 13 Method in network node 111, 112

METHODS AND APPARATUSES FOR CELL CONFIGURATION

CROSS REFERENCE TO RELATED APPLICATION(S)

This application is a 35 U.S.C. § 371 National Phase Entry Application from PCT/SE2015/050844, filed Aug. 4, 2015, designating the United States, and also claims the benefit of U.S. Provisional Application No. 62/035,534, filed Aug. 11, 2014. The disclosures of both applications are incorporated herein in their entirety by reference.

TECHNICAL FIELD

Embodiments herein relate to a wireless device, a first network node and methods therein. Especially, embodiments herein relate to performing cell configuration.

BACKGROUND

Communication devices such as terminals or wireless devices are also known as e.g. User Equipments (UE), mobile terminals, wireless terminals and/or mobile stations. Such terminals are enabled to communicate wirelessly in a wireless communication system or a cellular communications network, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

The above terminals or wireless devices may further be referred to as mobile telephones, cellular telephones, laptops, or tablets with wireless capability, just to mention some further examples. The terminals or wireless devices in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated at the base station site, may serve one or several cells. Further, each base station may support one or several communication technologies. The base stations communicate over the air interface operating on radio frequencies with the terminals or wireless devices within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

LTE uses Orthogonal Frequency-Division Multiplexing (OFDM) in the downlink and Discrete Fourier Transform (DFT)-spread OFDM in the uplink. The basic LTE downlink physical resource can thus be seen as a time-frequency grid as schematically illustrated in FIG. 1, where each resource element corresponds to one OFDM subcarrier during one OFDM symbol interval.

In the time domain, LTE downlink transmissions are organized into radio frames of 10 ms, each radio frame consisting of ten equally-sized subframes of length $T_{subframe}=1$ ms, cf. FIG. 2.

Furthermore, the resource allocation in LTE is typically described in terms of Resource Blocks (RB), where a resource block corresponds to one slot, e.g. 0.5 ms, in the time domain and 12 contiguous subcarriers in the frequency domain. A pair of two adjacent resource blocks in time direction, e.g. 1.0 ms, is known as a resource block pair. Resource blocks are numbered in the frequency domain, starting with 0 from one end of the system bandwidth.

The notion of Virtual Resource Blocks (VRB) and Physical Resource Blocks (PRB) has been introduced in LTE. The actual resource allocation to a terminal, e.g. a UE, is made in terms of VRB pairs. There are two types of resource allocations, e.g. localized resource allocation and distributed resource allocation. In the localized resource allocation, a VRB pair is directly mapped to a PRB pair, hence two consecutive and localized VRB are also placed as consecutive PRBs in the frequency domain. On the other hand, the distributed VRBs are not mapped to consecutive PRBs in the frequency domain; thereby providing frequency diversity for data channel transmitted using these distributed VRBs.

Downlink transmissions are dynamically scheduled, i.e., in each subframe the base station transmits control information about to which terminals data is transmitted and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI) indicated by the Physical CFI CHannel (PCHICH) transmitted in the first symbol of the control region. The control region also comprises Physical Downlink Control CHannels (PDCCH) and possibly also Physical Hybrid Automatic Repeat Request (HARQ) Indication CHannels (PHICH) carrying ACK/NACK for the uplink transmission.

The downlink subframe also comprises Common Reference Symbols (CRS), which are known to the receiver and used for coherent demodulation of e.g. the control information. A downlink system with CFI=3 OFDM symbols as control is illustrated in FIG. 3.

Random Access

In LTE, as in any communication system, a mobile terminal, e.g. a UE or wireless device, may need to contact the network, e.g. via the eNodeB, without having a dedicated resource in the Uplink (UL), i.e. from UE to base station. To handle this, a random access procedure is available where a UE that does not have a dedicated UL resource may transmit a signal to the base station. The first message of this procedure is typically transmitted on a special resource reserved for random access, e.g. on a Physical Random Access CHannel (PRACH). This channel can for instance be limited in time and/or frequency (as in LTE). See FIG. 4.

The resources available for PRACH transmission is provided to the terminals as part of the broadcasted system information in System Information Block 2 (SIB-2) or as part of dedicated RRC signaling in case of e.g. handover.

The resources consist of a preamble sequence and a time and/or frequency resource. In each cell, there are 64 preamble sequences available. Two subsets of the 64 sequences are defined, where the set of sequences in each subset is signaled as part of the system information. When performing a contention-based random-access attempt, the terminal selects at random one sequence in one of the subsets. As long as no other terminal is performing a random-access attempt using the same sequence at the same time instant, no collisions will occur and the attempt will, with a high likelihood, be detected by the base station, e.g. the eNodeB.

In LTE, the random access procedure may be used for a number of different reasons. Among these reasons are Initial access for e.g. UEs in the RRC_IDLE state;
Incoming handover;
Resynchronization of the UL e.g. UE inactivity after long DRX cycle, e.g. 640 ms, UE transmission after long inactivity, e.g. after 500 ms;
Scheduling request for e.g. a UE that is not allocated any other resource for contacting the base station;
Positioning e.g. for UE performing UE Rx-Tx time difference measurement, for enabling eNode B to perform eNode B Rx-Tx time difference measurement, timing advance etc.;

The contention-based random access procedure used in LTE Rel-10 is illustrated in FIG. 5 involving a UE and an LTE RAN comprising a base station e.g. an eNode B (eNB) communicating with the UE. The UE starts the random access procedure by randomly selecting one of the preambles available for contention-based random access. The UE then transmits the selected random access preamble on the Physical Random Access CHannel (PRACH) to the base station, e.g. the eNode B (eNB), in the RAN.

The RAN, e.g. the base station, acknowledges any preamble it detects by transmitting a random access response (MSG2) including an initial grant to be used on the uplink shared channel, a Temporary C-RNTI (TC-RNTI), and a Time Alignment (TA) update based on the timing offset of the preamble measured by the eNodeB on the PRACH. The MSG2 is transmitted in the DL to the UE using the PDSCH and its corresponding PDCCH message that schedules the PDSCH contains a Cyclic Redundancy Check (CRC) which is scrambled with the RA-RNTI.

When receiving the response from the RAN the UE uses the grant to transmit a message (MSG3) that in part is used to trigger the establishment of radio resource control and in part to uniquely identify the UE on the common channels of the cell. The timing alignment command provided in the random access response is applied in the UL transmission in MSG3.

In addition, the base station, e.g. the eNB, may also change the resources blocks that are assigned for a MSG3 transmission by sending an UL grant to the UE that has its CRC scrambled with the TC-RNTI which was included in MSG2. In this case the PDCCH is used, to transmit the DCI containing the uplink grant.

The RAN, e.g. the base station, sends a contention resolution message to the UE in MSG4. The MSG4, which is then contention resolving, has its PDCCH CRC scrambled with the C-RNTI if the UE previously has a C-RNTI assigned. If the UE does not have a C-RNTI previously assigned, the MSG4 has its PDCCH CRC scrambled with the TC-RNTI obtained from MSG2.

The procedure ends with the RAN, e.g. the base station, solving any preamble contention that may have occurred for the case that multiple UEs transmitted the same preamble at the same time. This can occur since each UE randomly selects when to transmit and which preamble to use. If multiple UEs select the same preamble for the transmission on RACH, there will be contention between these UEs that needs to be resolved through the contention resolution message (MSG4). The case when contention occurs is illustrated in FIG. 6, where two UEs denoted $UE_1$ and $UE_2$ transmit the same preamble $p_5$ at the same time. A third UE denoted $UE_3$ also transmits at the same RACH, but since it transmits with a different preamble $p_1$ there is no contention between this UE $UE_3$ and the other two UEs $UE_1$ and $UE_2$.

The UE can also perform non-contention based random access. A non-contention based random access or contention free random access can e.g. be initiated by the base station, e.g. the eNB, to get the UE to achieve synchronisation in UL. The eNB initiates a non-contention based random access either by sending a PDCCH order or indicating it in an RRC message. The latter of the two is used in case of handover (HO).

The procedure for the UE to perform contention free random access is illustrated in FIG. 7 involving a UE and an LTE RAN comprising a base station e.g. an eNode B (eNB) communicating with the UE. Similar to the contention based random access schematically illustrated in FIG. 5, the MSG2 is transmitted in the DL to the UE and its corresponding PDCCH message CRC is scrambled with the RA-RNTI. The UE considers the contention resolution successfully completed after it has received MSG2 successfully.

For the contention free random access as for the contention based random access does the MSG2 contain a timing alignment value. This enables the eNB to set the initial/updated timing according to the UEs transmitted preamble.

Dual Connectivity

A dual connectivity framework is currently being considered for LTE Rel-12. Dual Connectivity refers to the operation where a given UE consumes radio resources provided by at least two different network points, e.g. by a Master eNB (MeNB), sometimes herein also referred to as a Main eNB, and a Secondary eNB (SeNB) connected with non-ideal backhaul while in RRC_CONNECTED mode. By the expression non-ideal backhaul when used herein is meant that exchange of messages between the MeNB and SeNB involves at least some delay e.g. 10 ms or more. A UE in dual connectivity maintains simultaneous connections to anchor and booster nodes, where the MeNB is interchangeably called anchor node and the SeNB is interchangeably called booster node. As the name implies, the MeNB controls the connection and handover of SeNB. No SeNB standalone handover is defined for Rel-12. Signaling in MeNB is needed even in SeNB change. Both the anchor node and booster node may terminate the control plane connection towards the UE and may thus be the controlling nodes of the UE.

The UE reads system information from the anchor node. In addition to the anchor node, the UE may be connected to one or several booster nodes for added user plane support. The MeNB and SeNB are connected via the Xn interface, which is currently selected to be the same as the X2 interface between two eNBs.

More specifically Dual Connectivity (DC) is a mode of operation of a UE in RRC_CONNECTED state, where the UE is configured with a Master or Main Cell Group (MCG) and a Secondary Cell Group (SCG). Cell Group (CG) is a group of serving cells associated with either the MeNB or the SeNB. The MCG and SCG are defined as follows:

Master or Main Cell Group (MCG) is a group of serving cells associated with the MeNB, comprising a primary cell, PCell and optionally one or more secondary cells, SCells.

Secondary Cell Group (SCG) is a group of serving cells associated with the SeNB comprising of pSCell (Primary Scell) and optionally one or more SCells.

Master eNB is the eNB which terminates at least S1-MME. Secondary eNB is the eNB that is providing additional radio resources for the UE but is not the Master eNB.

FIG. 8 describes dual connectivity setup. In this example, only one SeNB is connected to the UE, however, more than one SeNB may serve the UE in general. As shown in the figure, it is also clear that dual connectivity is a UE specific feature and a network node may support a dual connected UE and a legacy UE at the same time.

As mentioned earlier, the anchor and booster roles for any specific node are defined from a UE point of view. This means that a node that acts as an anchor node to one UE may act as booster node to another UE. Similarly, though the UE reads the system information from the anchor node, a node acting as a booster node to one UE, may or may not distribute system information to another UE.

In this disclosure, anchor node and MeNB are used with interchangeable meaning, and similarly, SeNB and booster node are also used interchangeably herein.

MeNB:
Provides system information
Terminates control plane
May terminate user plane
SeNB:
May terminate control plane
Terminates only user plane In one application, dual connectivity allows a UE to be connected to two network nodes to receive data from both nodes to increase its data rate. This user plane aggregation achieves similar benefits as Carrier Aggregation (CA) using network nodes that are not connected by low-latency backhaul connection and/or network connection. Due to this lack of low-latency backhaul, the scheduling and HARQ-ACK feedback from the UE to each of the nodes will need to be performed separately. That is, it is expected that the UE may have two UL transmitters to transmit UL control and data to the connected nodes.

Synchronized or Unsynchronized Dual Connectivity Operation

Since dual connectivity operation involves two non-co-located transmitters, i.e. MeNB and SeNB, one issue related to UE receiver performance is the maximum receive timing difference Δt of the signals from MeNB and SeNB received at the UE receiver. This gives rise to two cases of DC operation with respect to the UE: synchronized DC operation and unsynchronized DC operation.

The synchronized DC operation herein means that the UE may perform DC operation provided the received time difference Δt between the signals received at the UE from the CCs belonging to the MCG and SCG are within a certain threshold e.g. ±33 μs.

The unsynchronized DC operation herein means that the UE may perform DC operation regardless of the received time difference Δt between the signals received at the UE from the CCs belonging to the MCG and SCG i.e. for any value of Δt up to 500 μs.

Maximum receive timing difference Δt at the UE consists of the components, namely:
(1) Relative propagation delay difference between MeNB and SeNB,
(2) Tx timing difference due to synchronization levels between antenna connectors of MeNB and SeNB, and
(3) Delay due to multipath propagation of radio signals SCell Activation/Deactivation Procedure In dual connectivity the UE will be connected to two eNodeBs simultaneously; MeNB and SeNB. Each of them may have one or more associated SCells which may be configured for DL, or DL and UL CA operation. The SCells are time-aligned to the MeNB and SeNB, respectively, but the MeNB and SeNB may or may not be time aligned with respect to their frame timings and/or their respective System Frame Number (SFN).

MeNB can only activate and deactivate serving cells, e.g. SCells, associated with MeNB. SeNB can only activate and deactivate serving cells, e.g. SCells, associated with SeNB. Cross-eNB activation and/or deactivation is not supported.

The configuration and simultaneous activation, as well as release (hence deactivation), of Special SCell belonging to SeNB is done by MeNB, and hence that the above mentioned agreement shall only refer to SCells associated with MCG and SCG, respectively. Hence, for example, the MeNB configures and activates the Special SCell but not any of the ordinary SCells in the SCG. Similarly the MeNB deactivates and releases the Special SCell but not any of the ordinary SCells in the SCG.

For configuration and simultaneous implicit activation of Special SCell it shall be noted that the activation time may be considerable longer than currently assumed for legacy CA. The fact that the Special SCell goes directly into activated state upon configuration means that the UE might not have had a chance to identify it before the activation, hence the activation might be blind. The UE will also have to acquire SFN timing difference to MeNB by reading MIB from the Special SCell as part of the activation procedure, for purpose of aligning e.g. DRX cycle offset and measurement gap offset between MeNB and SeNB. Acquiring SFN adds maximum an extra 50 ms to the activation time both for regular and blind activation of the Special SCell.

For legacy CA, i.e. CA without dual connectivity, the SCell activation times are 24 and 34 ms for regular and blind activation, respectively; 3GPP TS 36.133 section 7.7, Release 10 (Rel-10). For those numbers to apply it is assumed that the SCell has already been configured by the network via RRC Connection Reconfiguration message (3GPP TS 36.331 section 5.3.5, Rel-10) when the MAC control element activating the cell is received (3GPP TS 36.321 section 5.13, Rel-10). Hence for simultaneous configuration and activation also the RRC procedure delay needs to be taken into account—often 15 ms is assumed for such delay.

Blind activation in legacy CA can make use of that it is known that the maximum time difference between any two cells being aggregated shall be within 30.26 ms (3GPP TS 36.300 annex J.1). Hence the UE only has to assume that the cell to be detected is misaligned by at most half an OFDM symbol, which significantly improves and speeds up the cell detection. In case of unsynchronized MeNB and SeNB both with respect to SFN and frame timing, the UE cannot make such assumption, and the cell detection will be similar to cell detection time for blind handover, which under favourable signal conditions is specified to 80 ms (3GPP TS 36.133 section 5.1).

SUMMARY

In dual connectivity involving two primary cells serving a UE, the UE, e.g. the wireless device, may need to send PRACH to both the primary cells, e.g. the primary cell (PCell) and the primary secondary cell (PSCell), in MeNB and SeNB, simultaneously. As will be described below, sometimes herein, the MeNB is referred to as a first network node, the SeNB is referred to as a second network node, the PCell is referred to as a first serving cell and the PSCell is referred to as a second serving cell. The UE may send PRACH to the PSCell for initial configuration and/or activation. Since the UE may be power limited, therefore any attempt to transmit the two PRACH to the PCell and the PSCell in MeNB and SeNB, respectively, will disrupt the dual connectivity operation. Embodiments herein address this problem and devise solutions to solve this problem.

Further, the configuration and/or activation of PSCell in dual connectively is completed when the UE sends Random Access (RA) to the PSCell. However, in the prior art, during or at the start of such procedure the UE may also have to send another RA to the PCell. An attempt to perform simultaneous RA transmissions to the PSCell and the PCell may prevent the UE to correctly execute the configuration and/or activation of the PSCell. Also any attempt to perform simultaneous RA transmissions to the PSCell and the PCell may also disrupt the procedure related to the PCell e.g. handover, positioning measurement etc. In existing solution there is no mechanism to address this problem.

Therefore, an object of embodiments herein is to overcome the above-mentioned drawbacks among others and to improve the performance in a wireless communications network.

According to a first aspect of embodiments herein, the object is achieved by a method performed by a wireless device for performing cell configuration. The wireless device and a first network node serving the wireless device are operating in a wireless communications network, wherein the first network node manages a first serving cell.

When the wireless device is to send a second Random Access (RA) transmission in the first serving cell to the first network node while preparing to perform or performing configuration of a second serving cell managed by a second network node, the wireless device configures the second serving cell using a configuration time delay $T_{act\_PSCell}$ comprising at least a time delay $T_{RA\_PCell}$ due to the second RA transmission, otherwise the wireless device configures the second serving cell using the configuration time delay $T_{act\_PSCell}$ excluding the time delay $T_{RA\_PCell}$ due to the second RA transmission.

According to a second aspect of embodiments herein, the object is achieved by a wireless device for performing cell configuration. The wireless device and a first network node serving the wireless device are operable in a wireless communications network. The first network node manages a first serving cell.

When the wireless device is to send a second Random Access (RA) transmission in the first serving cell to the first network node while preparing to perform or performing configuration of a second serving cell managed by a second network node, the wireless device is configured to configure the second serving cell using a configuration time delay $T_{act\_PSCell}$ comprising at least a time delay $T_{RA\_PCell}$ due to the second RA transmission, otherwise the wireless device is configured to configure the second serving cell using the configuration time delay $T_{act\_PSCell}$ excluding the time delay $T_{RA\_PCell}$ due to the second RA transmission.

According to a third aspect of embodiments herein, the object is achieved by a method performed by a first network node for assisting a wireless device in performing cell configuration. The wireless device and the first network node serving the wireless device are operable in a wireless communications network. The first network node manages a first serving cell.

The first network node determines based on one or more criteria whether the wireless device is using or is expected to use a first method or a second method for performing configuration of a second serving cell managed by a second network node.

The first method is configured to be performed over a configuration time delay $T_{act\_PSCell}$ comprising at least a time delay $T_{RA\_PCell}$ due to a second Random Access (RA) transmission, when the wireless device is to send the second RA transmission in the first serving cell to the first network node while preparing to perform or performing configuration of the second serving cell.

The second method is configured to be performed over the configuration time delay $T_{RA\_PSCell}$ excluding the time delay $T_{RA\_PCell}$ due to the second RA transmission, when the wireless device is not to send the second RA transmission in the first serving cell while preparing to perform or performing configuration of the second serving cell.

Further the first network node transmits, to the wireless device, information relating to the determined first or second method.

According to a fourth aspect of embodiments herein, the object is achieved by a first network node for assisting a wireless device in performing cell configuration, wherein the wireless device and the first network node serving the wireless device are operating in a wireless communications network. The first network node manages a first serving cell.

The first network node is configured to determine based on one or more criteria whether the wireless device is using or is expected to use a first method or a second method for performing configuration of a second serving cell managed by a second network node.

The first method is configured to be performed over a configuration time delay $T_{act\_PSCell}$ comprising at least a time delay $T_{RA\_PCell}$ due to a second Random Access (RA) transmission, when the wireless device is to send the second RA transmission in the first serving cell to the first network node while preparing to perform or performing configuration of the second serving cell.

The second method is configured to be performed over the configuration time delay $T_{act\_PSCell}$ excluding the time delay $T_{RA\_PCell}$ due to the second RA transmission, when the wireless device is not to send the second RA transmission in the first serving cell while preparing to perform or performing configuration of the second serving cell.

Further, the first network node is configured to transmit, to the wireless device, information relating to the determined first or second method.

According to a fifth aspect of embodiments herein, the object is achieved by a computer program, comprising instructions which, when executed on at least one processor, causes the at least one processor to carry out the method performed by the wireless device.

According to a sixth aspect of embodiments herein, the object is achieved by a computer program, comprising instructions which, when executed on at least one processor, causes the at least one processor to carry out the method performed by the first network node.

According to a seventh aspect of embodiments herein, the object is achieved by a carrier comprising the computer program, wherein the carrier is one of an electronic signal, an optical signal, a radio signal or a computer readable storage medium.

Since the wireless device configures the second serving cell using a configuration time delay $T_{act\_PSCell}$ comprising at least a time delay $T_{RA\_PCell}$ due to the second RA transmission, when the wireless device is to send the second RA transmission in the first serving cell to the first network node while preparing to perform or performing configuration of a second serving cell managed by a second network node, and since the wireless device configures the second serving cell using the configuration time delay $T_{act\_PSCell}$ excluding the time delay $T_{RA\_PCell}$ due to the second RA transmission, when the wireless device is not to send the second RA transmission in the first serving cell to the first network node while preparing to perform or performing configuration of the second serving cell, the wireless device consumes less power without interrupting the dual connectivity operation or ongoing procedures, such as handover and/or positioning measurement relating to the serving cell. This results in an improved performance in the wireless communications network.

An advantage with embodiments herein is thus that the dual connectivity operation and other ongoing procedures, such as handover and/or positioning measurement relating to the serving cell, will not be interrupted.

Another advantage is that the wireless device may perform PSCell configuration and/or activation procedure, i.e. the configuration of the second serving cell, without discarding random access to the first serving cell (PCell).

A further advantage is that the wireless device is enabled to send RA to the first serving cell under critical situation, e.g. positioning measurements for emergency call, etc., by adaptively delaying the PSCell configuration and/or activation procedure.

A yet further advantage is that the wireless device is enabled to adapt the PSCell configuration and/or activation procedure in response to simultaneous transmissions of RA to the PCell, e.g. the first serving cell, and the at least one PSCell, e.g. the second serving cell.

BRIEF DESCRIPTION OF DRAWINGS

Examples of embodiments herein will be described in more detail with reference to attached drawings in which.

DETAILED DESCRIPTION

Terminologies

Figure 1:
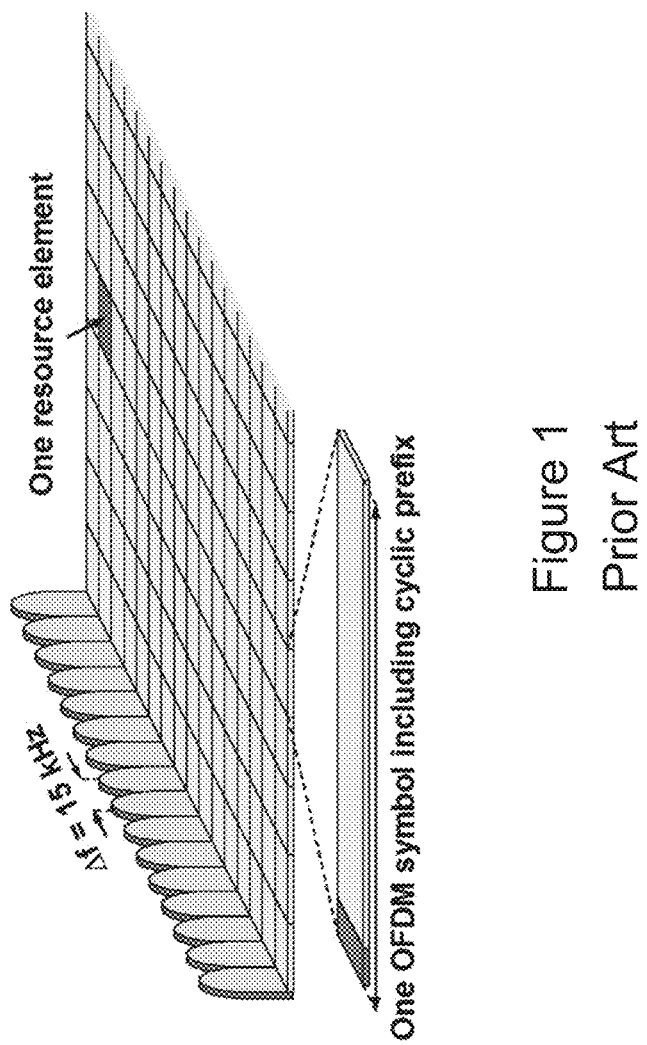
FIG. 1 schematically illustrates an LTE downlink physical resource.
Figure 2:
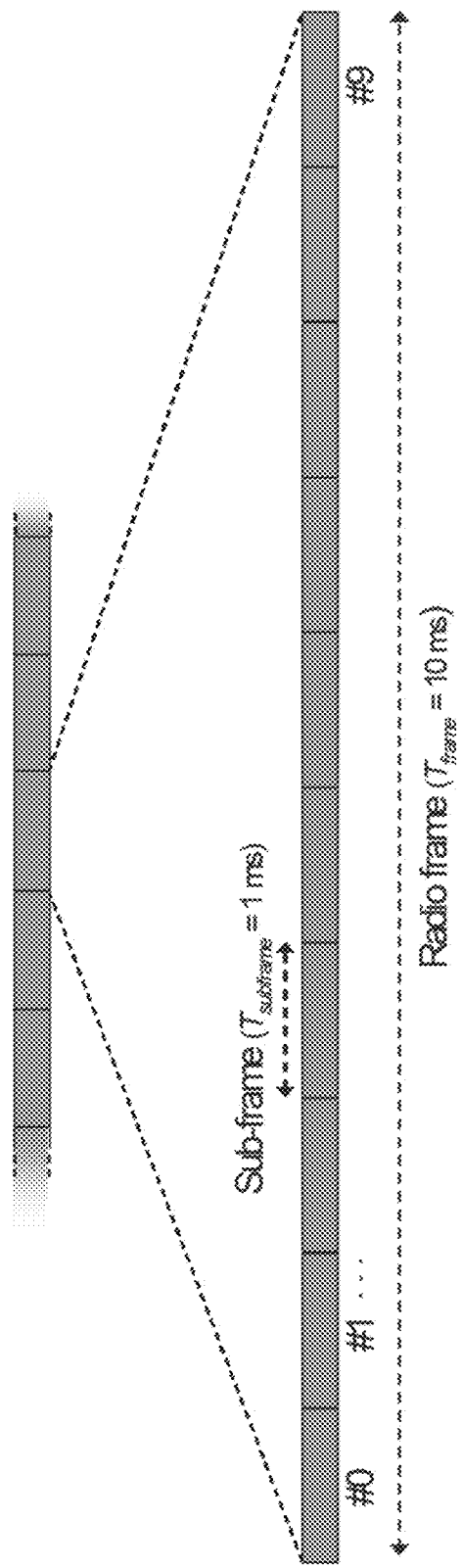
FIG. 2 schematically illustrates an LTE time-domain structure.
Figure 3:
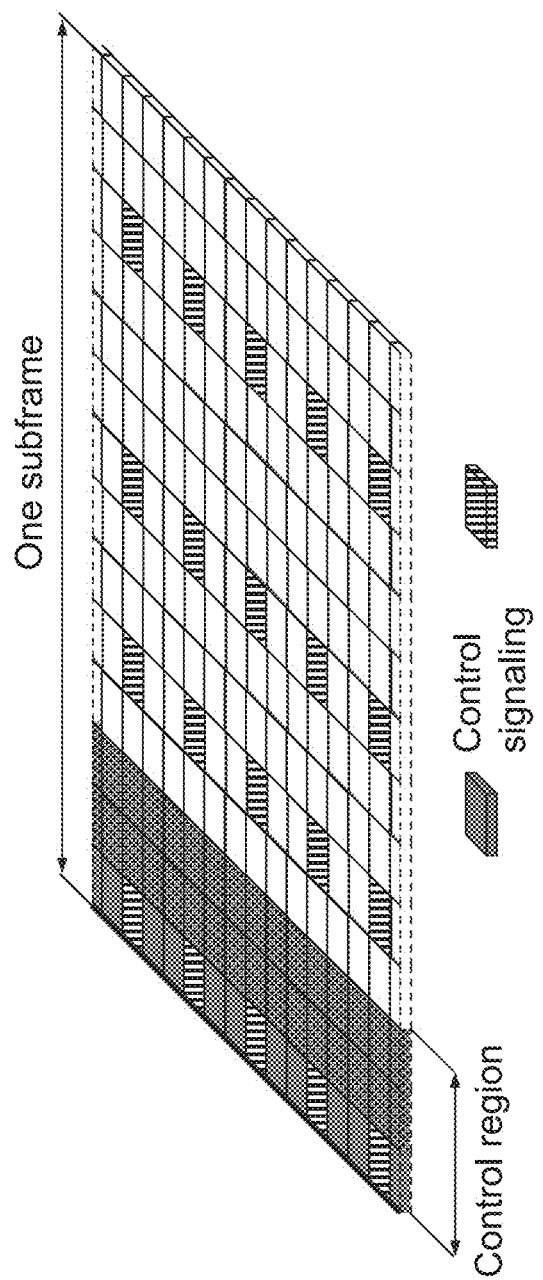
FIG. 3 schematically illustrates a downlink subframe.
Figure 4:
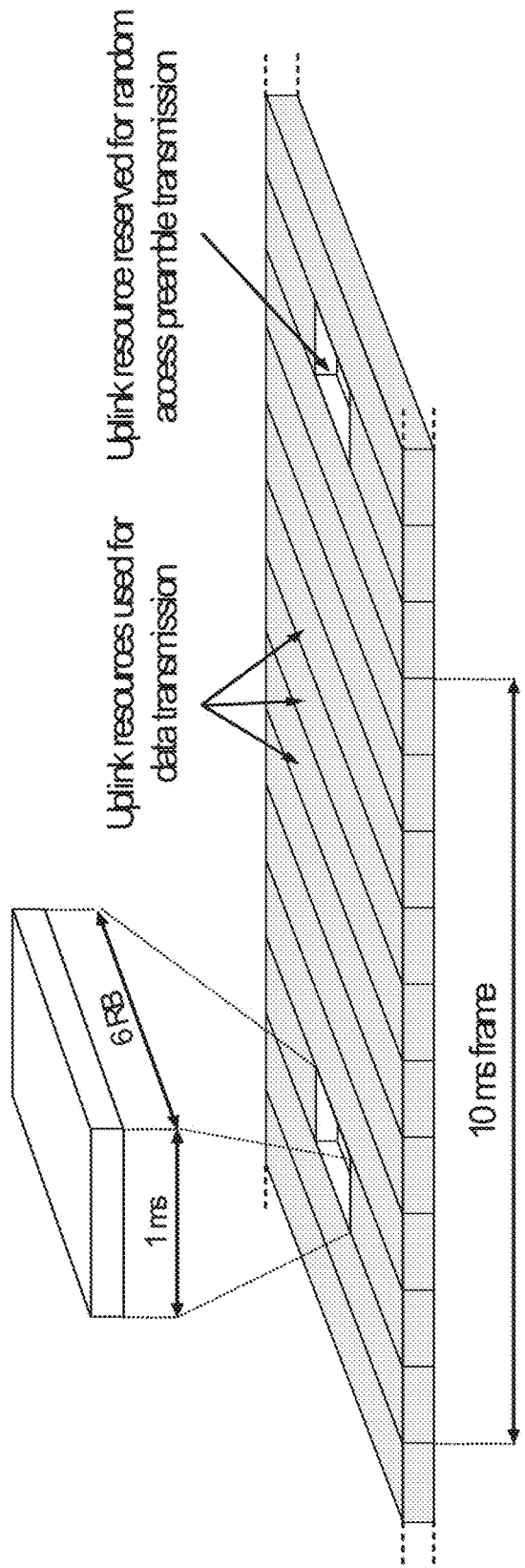
FIG. 4 schematically illustrates a random-access-preamble transmission.
Figure 5:
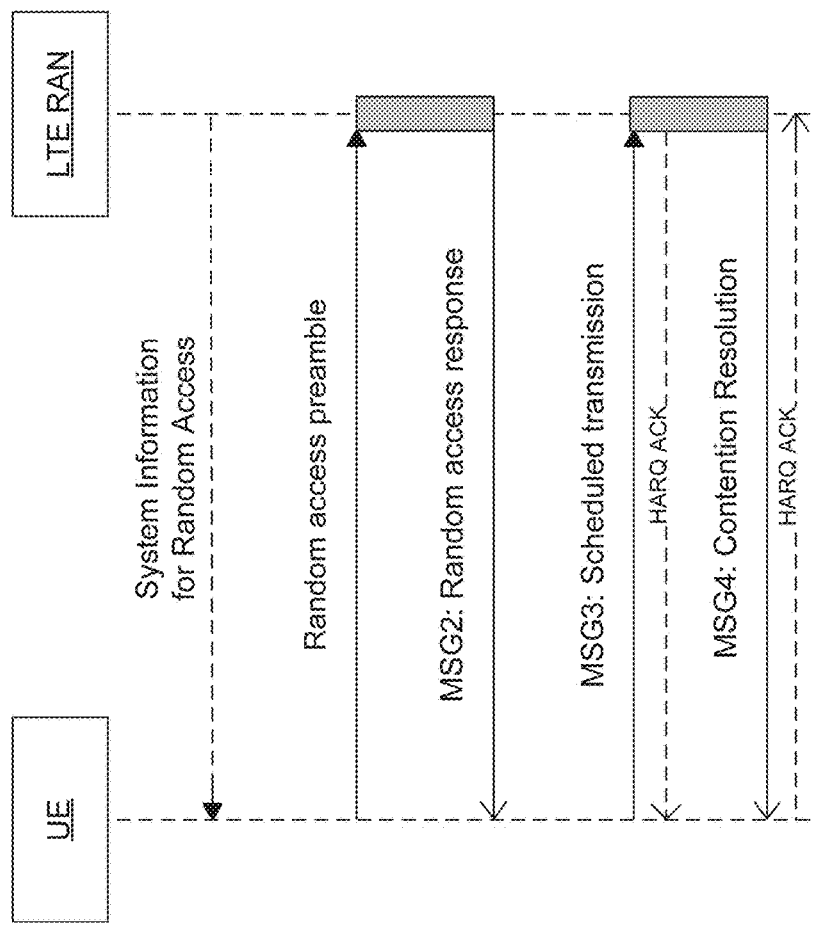
FIG. 5 is a signalling diagram that schematically illustrates a contention-based random access procedure.
Figure 6:
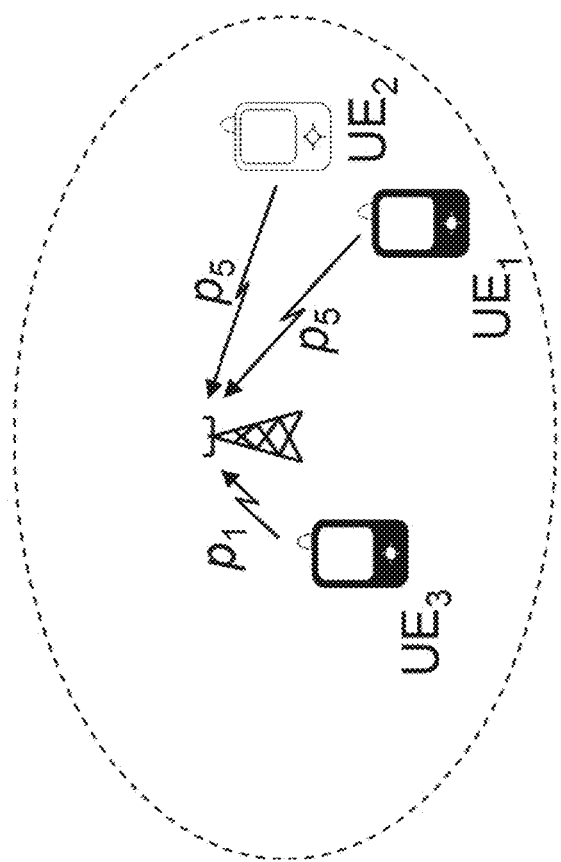
FIG. 6 schematically illustrates a wireless communications network with contention between two UEs.
Figure 7:
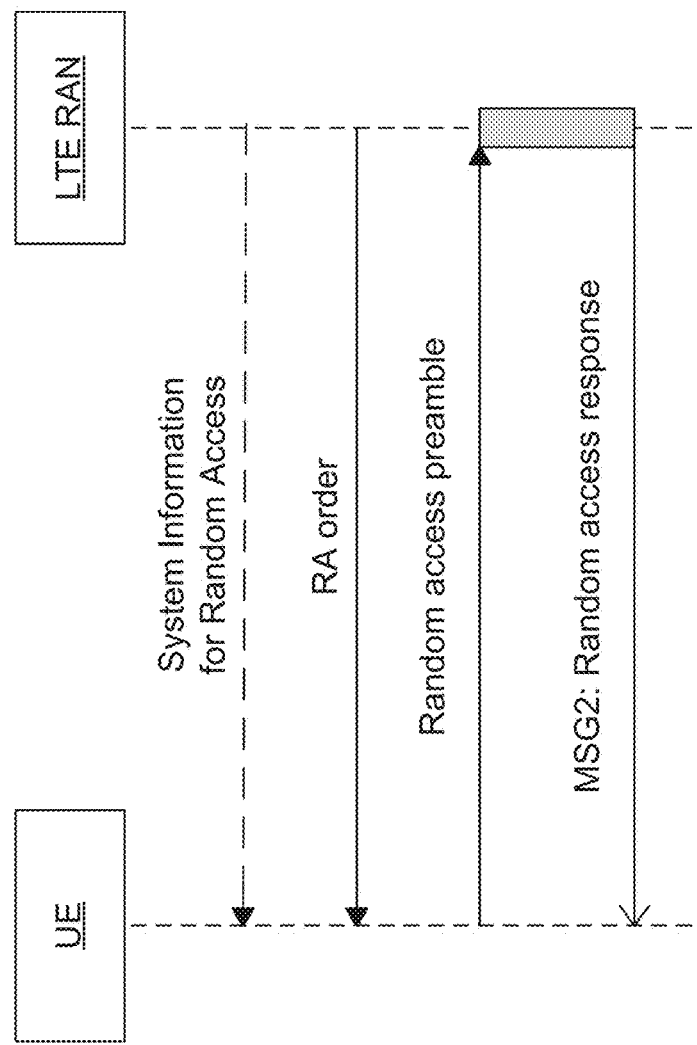
FIG. 7 is a signalling diagram that schematically illustrates a contention-free random access procedure.
Figure 8:
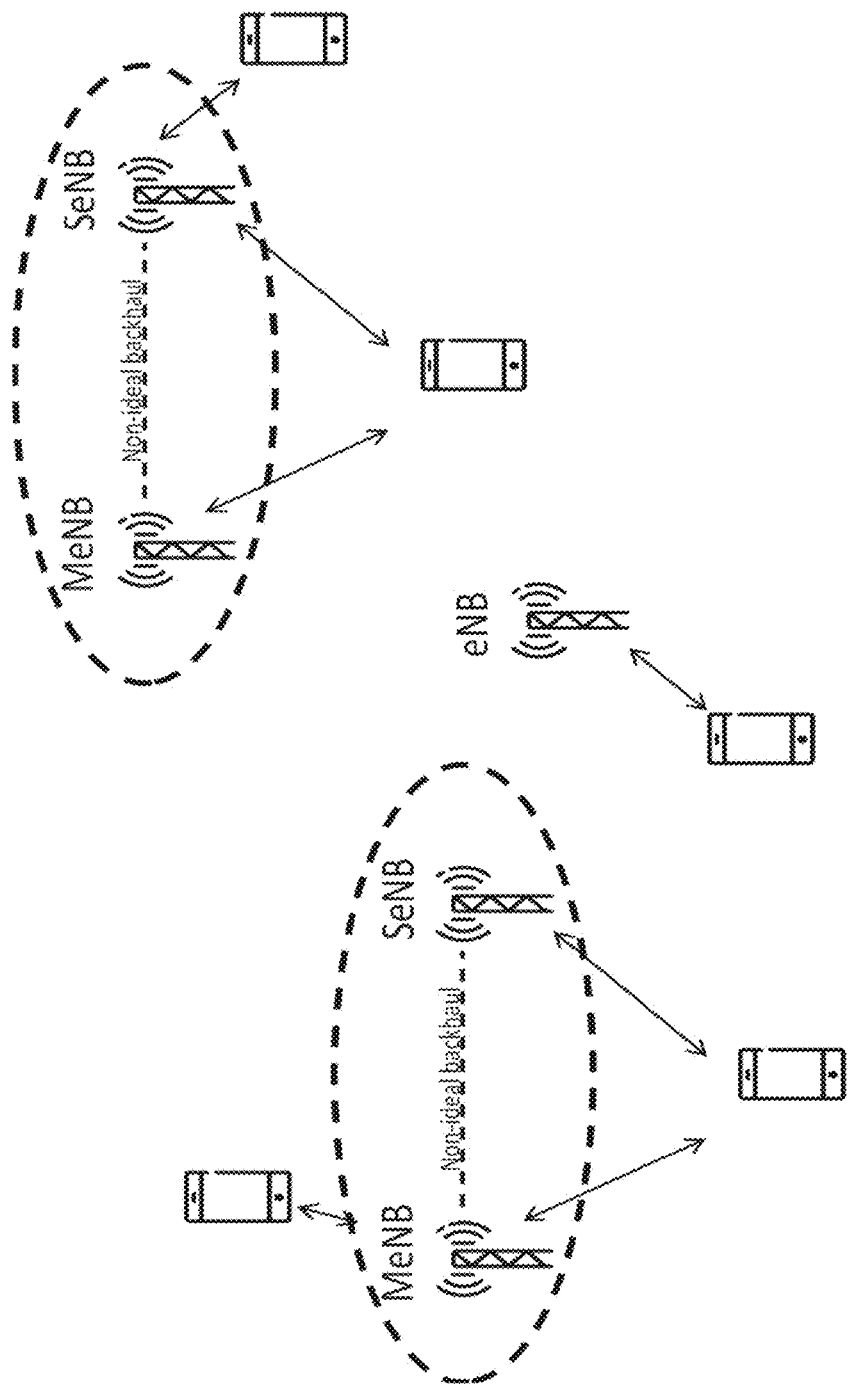
FIG. 8 schematically illustrates a wireless communications network comprising dual connectivity deployment.

The following commonly terminologies are used in embodiments described herein and are elaborated below:

Network node: In some embodiments a more general term "network node" is used and it may correspond to any type of radio network node or any network node, which communicates with a UE and/or with another network node. Examples of network nodes are NodeB, MeNB, SeNB, a network node belonging to MCG or SCG, Base Station (BS), multi-Standard Radio (MSR) radio node such as MSR BS, eNodeB, network controller, radio Network Controller (RNC), Base Station Controller (BSC), relay, donor node controlling relay, Base Transceiver Station (BTS), Access Point (AP), transmission points, transmission nodes, Radio Remote Unit (RRU), Remote Radio Head (RRH), nodes in Distributed Antenna System (DAS), core network node (e.g. Mobile Switching Center (MSC), Mobility Management Entity (MME) etc), Operations and Maintenance (O&M), Operations Support System (OSS), Self-organizing Network (SON), positioning node (e.g. Enhanced Serving Mobile Location Center (E-SMLC)), Mobile Data Terminal (MDT) etc.

User Equipment/Wireless Device:

In some embodiments the non-limiting terms wireless device and User Equipment (UE) are used and they refer to any type of wireless device communicating with a network node and/or with another UE in a cellular or mobile communication system. Examples of UE/wireless device are target device, Device-to-Device (D2D) UE, machine type UE or UE capable of machine to machine (M2M) communication, Personal Digital Assistant (PDA), iPAD, Tablet, mobile terminals, smart phone, Laptop Embedded Equipped (LEE), Laptop Mounted Equipment (LME), Universal Serial Bus (USB) dongles etc. In this disclosure the terms wireless device and UE are used interchangeably General Note that although terminology from 3GPP LTE has been used in this disclosure to exemplify embodiments, this should not be seen as limiting the scope of the invention to only the aforementioned system. Other wireless systems, including Wideband Code Division Multiple Access (WCDMA), High Speed Packet Access (HSPA), Worldwide Interoperability for Microwave Access (WiMax), WiFi, Wireless Local Area Network (WLAN), and Global System for Mobile Communications (GSM)/GSM EDGE Radio Access Network (GERAN), may also benefit from exploiting the ideas covered within this disclosure.

Also note that terminology such as eNodeB and UE should be considering non-limiting and does in particular not imply a certain hierarchical relation between the two; in general "eNodeB" could be considered as device 1 and "UE" device 2, and these two devices communicate with each other over some radio channel. Further, the description frequently refers to wireless transmissions in the downlink, but embodiments herein are equally applicable in the uplink.

The embodiments are described in the context of single carrier operation of the UE. However, the embodiments are applicable for multi-carrier or carrier aggregation operation of the UE. Therefore, the embodiment methods of signaling information to the UE or to the other network node may be carried out independently for each cell on each carrier frequency supported by the network node.

In this disclosure, MeNB and SeNB refer to two different network nodes, as previously described.

In the following section, embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Figure 9:
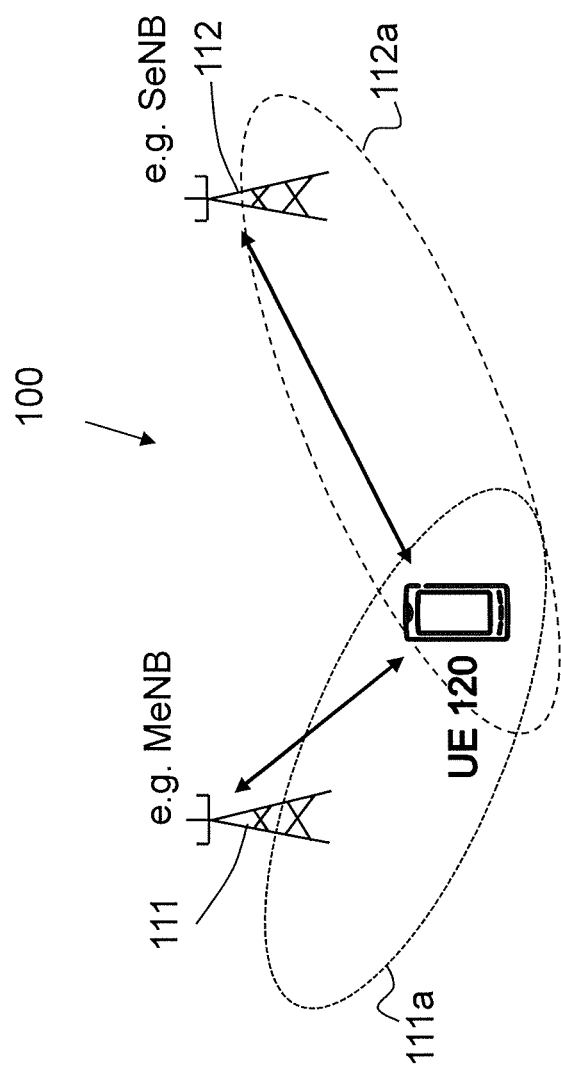
FIG. 9 schematically illustrates an embodiment of a wireless communications network.

FIG. 9 depicts an example of a wireless communications network 100 in which embodiments herein may be implemented. The wireless communications network 100 is a wireless communication network such as an LTE, WCDMA, GSM network, any 3GPP cellular network, Wimax, or any cellular network or system.

The wireless communications network 100 comprises a plurality of network nodes whereof a first network node 111 and a second network node 112 are depicted in FIG. 9. The first network node 111 and the second network node 112 may each be a transmission point such as a radio base station, for example an eNB, an eNodeB, or a Home Node B, an Home eNode B or any other network node capable to serve a user equipment or a machine type communication device in a wireless communications network.

In this description, the first network node 111 is sometimes referred to as a Master or Main eNB (MeNB), or as an anchor node. Thus, the terms first network node, MeNB and anchor node are used interchangeably.

Further, in this description, the second network node 112 is sometimes referred to as a Secondary eNB (SeNB) or as a booster node. Thus, the terms second network node, SeNB and booster node are used interchangeably.

The first network node 111 is configured for wireless communication with one or more wireless devices, such as a wireless, when located within a geographical area, e.g. a first serving cell 111a, served by the first network node 111. Herein, this is also specified as the first network node 111 manages or is configured to manage the first serving cell 111a. In this description, the first serving cell 111a is sometimes referred to as a Primary Cell (PCell). Thus, the terms first serving cell and PCell are used interchangeably herein.

The second network node 112 is configured for wireless communication with one or more wireless devices, such as the wireless device 120, when located within a geographical area, e.g. a second serving cell 112a, served by the second network node 112. Herein, this is also specified as the second network node 112 manages or is configured to manage the second serving cell 112a. In this description, the second serving cell 112a is sometimes referred to as a Primary Secondary Cell (PSCell). Thus, the terms second serving cell and PSCell are used interchangeably herein.

The wireless device 120 also referred to as a user equipment or UE is located in the wireless communication network 100. The first wireless device 120 may e.g. be a user equipment, a mobile terminal or a wireless terminal, a mobile phone, a computer such as e.g. a laptop, a Personal Digital Assistants (PDAs) or a tablet computer, sometimes referred to as a surf plate, with wireless capability, or any other radio network units capable to communicate over a radio link in a wireless communications network. It should be noted that the term user equipment used in this document also covers other wireless devices such as Machine to machine (M2M) devices, even though they are not handled by any user.

Embodiments described herein comprises a number of actions that may be performed at the network node side, e.g. at the first network node 111, and the UE side, e.g. at the wireless device 120. For example, while configuring and/or activating a PSCell in SeNB: if the UE is not required to send RA on the PCell in MeNB then the UE uses a first method to configure and/or activate the PSCell, but if the UE is also required to send RA on the PCell in the MeNB then UE uses a second method to configure and/or activate the PSCell. In other words, while configuring and/or activating the second serving cell 112a at the second network node 112, if the wireless device 120 is not required to send RA on the first serving cell 111a in the first network node 111 then the wireless device 120 uses a first method to configure and/or activate the second serving cell 112a, but if the wireless device 120 is also required to send RA on the first serving cell in the first network node then the wireless device 120 uses a second method to configure and/or activate the second serving cell 112a.

One or more of the following actions may be performed in a UE, e.g. the wireless device 120, configured to operate in Dual Connectivity (DC):

Determining whether the UE, e.g. the wireless device 120, is triggered or has received a request to send a second Random Access (RA) transmission while the UE, e.g. the wireless device 120, is preparing to perform or is performing configuration and/or activation of at least one primary secondary cell (PSCell), e.g. the second serving cell 112a, said second random access transmission is used for sending RA to a primary cell (PCell), e.g. the first serving cell 111a, and said PSCell and PCell are primary serving cells belonging to Master Cell Group (MCG) and Secondary Cell Group (SCG), respectively, in DC operation;

Adapting or selecting between at least a first method and a second method to configure and/or activate at least one PSCell, e.g. the second serving cell 112a, depending upon the determination that whether or not the UE, e.g. the wireless device 120, has been triggered or received the request to send the second RA;

Configuring and/or activating at least one PSCell, e.g. the second serving cell 112a, based on the adapted method.

One or more of the following actions may be performed in a network node, e.g. the first network node 111, communicating with a UE, e.g. the wireless device 120, configured to operate in dual connectivity (DC):

Determining based on one or more criteria out of at least a first method and a second method for use by a UE, e.g. the wireless device 120, to configure and/or activate at least one PSCell, e.g. the second serving cell 112a;

Transmitting to the UE, e.g. the wireless device 120, information related to the determined method and/or at least one parameter related to the to the determined method.

Figure 10:
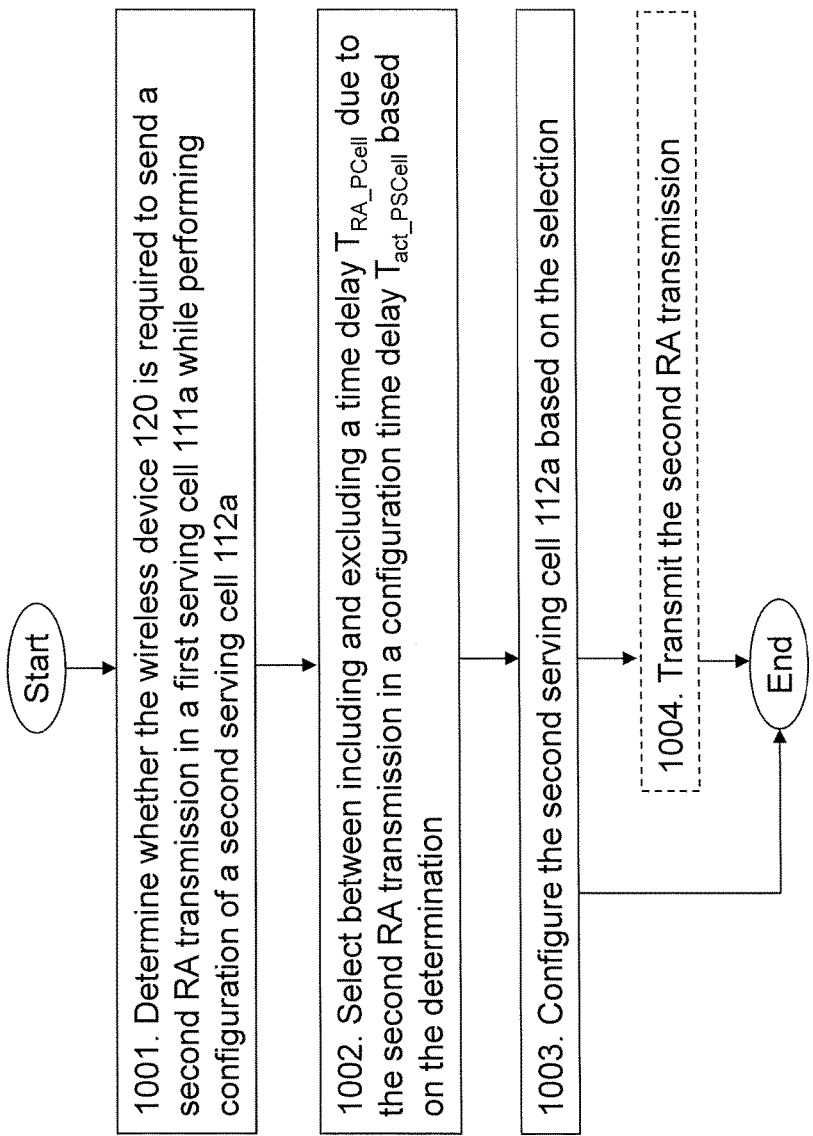
FIG. 10 is a flowchart depicting embodiments of a method performed by a wireless device.

An example of a method performed by the wireless device 120 for performing cell configuration will now be described with reference to a flowchart depicted in FIG. 10. The wireless device 120 and the first network node 111 serving the wireless device 120 are operating in the wireless communications network 100, and the first network node 111 manages the first serving cell 111a.

The methods comprise one or more of the following actions. It should be understood that these actions may be taken in any suitable order and that some actions may be combined.

Action 1001

The wireless device 120 may determine whether it is required to send a second Random Access (RA) transmission in the first serving cell 111a to the first network node 111 while performing configuration of the second serving cell 112a.

The RA transmission in the first serving cell 111a to the first network node 111 is herein referred to as the second RA transmission since the wireless device 120 while performing configuration of the second serving cell 112a has or is to send a RA transmission in the second serving cell 112a to the second network node 112 which RA transmission herein is referred to as a first RA transmission. However, it should be understood that the first RA transmission may be referred to as the second RA transmission and vice versa.

Action 1002

In some embodiments, when the wireless device 120 has determined whether the wireless device 120 is required to send the second RA transmission in the first serving cell 111a to the first network node 111 while performing configuration of the second serving cell 112a as mentioned in Action 1001 above, the wireless device 120 selects between including and excluding the time delay $T_{RA\_PCell}$ due to the second RA transmission in the total time delay $T_{act\_PSCell}$ based on the determination.

When used herein, the expression "including and excluding the time delay $T_{RA\_PCell}$ in the configuration time delay $T_{act\_PSCell}$" should be understood as whether or not the time delay $T_{RA\_PCell}$ is to be comprised in the configuration time delay $T_{act\_PSCell}$. It should be understood that irrespective of whether or not the time delay $T_{RA\_PCell}$ is comprised in the configuration time delay $T_{act\_PSCell}$, the configuration time delay $T_{act\_PSCell}$ may comprise one or more other time delays.

In some embodiments, the wireless device 120 selects between including and excluding the time delay $T_{RA\_PCell}$ due to the second RA transmission by further selecting to exclude the time delay $T_{RA\_PCell}$ due to the second RA transmission when the wireless device 120 is not required to send the second RA transmission to the first network node 111 while the wireless device 120 is preparing to perform or is performing configuration of the second serving cell 112a.

Alternatively, in some embodiments, the wireless device 120 selects between including and excluding the time delay $T_{RA\_PCell}$ due to the second RA transmission by further selecting to include the time delay $T_{RA\_PCell}$ due to the second RA transmission when the wireless device 120 is to send the second RA transmission to the first network node 111 while the wireless device 120 is preparing to perform or is performing configuration of the second serving cell 112a.

Action 1003

When the wireless device 120 is to send the second RA transmission in the first serving cell 111a to the first network node 111 while preparing to perform or performing configuration of a second serving cell 112a managed by a second network node 112, the wireless device 120 configures the second serving cell 112a using a configuration time delay $T_{act\_PSCell}$ comprising at least a time delay $T_{RA\_PCell}$ due to the second RA transmission; otherwise the wireless device 120 configures the second serving cell 112a using the configuration time delay $T_{act\_PSCell}$ excluding the time delay $T_{RA\_PCell}$ due to the second RA transmission.

Thus, the wireless device 120 may configure the second serving cell 112a based on the selection described under Action 1002 above.

The expression "second RA on PCell in MeNB" is sometimes used herein for the second RA transmission sent from the wireless device 120 in the first serving cell 111a to the first network node 111.

In some embodiments, the configuration delay $T_{act\_PSCell}$ further comprises a time delay $T_{RA\_PSCell}$ due to a first RA transmission in the second serving cell 112a managed by the second network node 112.

In some embodiments, when the wireless device 120 selects to exclude the time delay $T_{RA\_PCell}$ due to the second RA transmission, the configuration time delay $T_{act\_PSCell}$ is expressed as:

$$T_{act\_PSCell} = \alpha + T_{RRC} + T_{act} + T_{SFNacq} + T_{RA\_PSCell},$$

wherein $\alpha$ is a margin parameter, $T_{RRC}$ is a time delay due to a Radio Resource Control (RRC) procedure, $T_{act}$ is a time delay due to a second serving cell activation procedure, $T_{SFNacq}$ is a time delay due to a System Frame Number (SFN) acquisition procedure and $T_{act\_PSCell}$ is a time delay due to a first RA transmission in the second serving cell 112a managed by the second network node 112.

Alternatively, in some embodiments, when the wireless device 120 selects to include the time delay $T_{RA\_PCell}$ due to the second RA transmission, the configuration time delay $T_{act\_PSCell}$ is expressed as:

$$T_{act\_PSCell} = \beta + T_{RRC} + T_{act} + T_{SFNacq} + T_{act\_PSCell} + T_{RA\_PCell} * K,$$

wherein $\beta$ is a margin parameter, $T_{RRC}$ is a time delay due to a RRC procedure, $T_{act}$ is a time delay due to a second serving cell activation procedure, $T_{SFNacq}$ is a time delay due to a SFN acquisition procedure, $T_{act\_PSCell}$ is a time delay due to the first RA transmission, $T_{RA\_PCell}$ is a time delay due to the second RA transmission and K is an integer defining the number of the second RA transmissions to be sent while the wireless device 120 is preparing to perform or is performing configuration of the second serving cell 112a.

Action 1004

In some embodiments, the wireless device 120 transmits the second RA transmission to e.g. the first network node 111.

For example, this may be the case, when K is equal to or larger than 1. In such case, the wireless device 120 may transmit the second RA transmission with priority over transmitting the first RA transmission.

The wireless device 120 may transmit the second RA transmission using a non-contention based Physical Radio Access Channel (PRACH).

Further, the wireless device 120 may transmit the second RA transmission when required to be transmitted for performing or enabling one or more of: a positioning measurement, a timing advance measurement, an activation, an incoming call, a handover, and a cell change acquisition of uplink transmit timing.

In some embodiments, the wireless device 120 transmits the second RA transmission in dependence of a target configuration delay time for the configuration of the second serving cell 112a.

Figure 11:
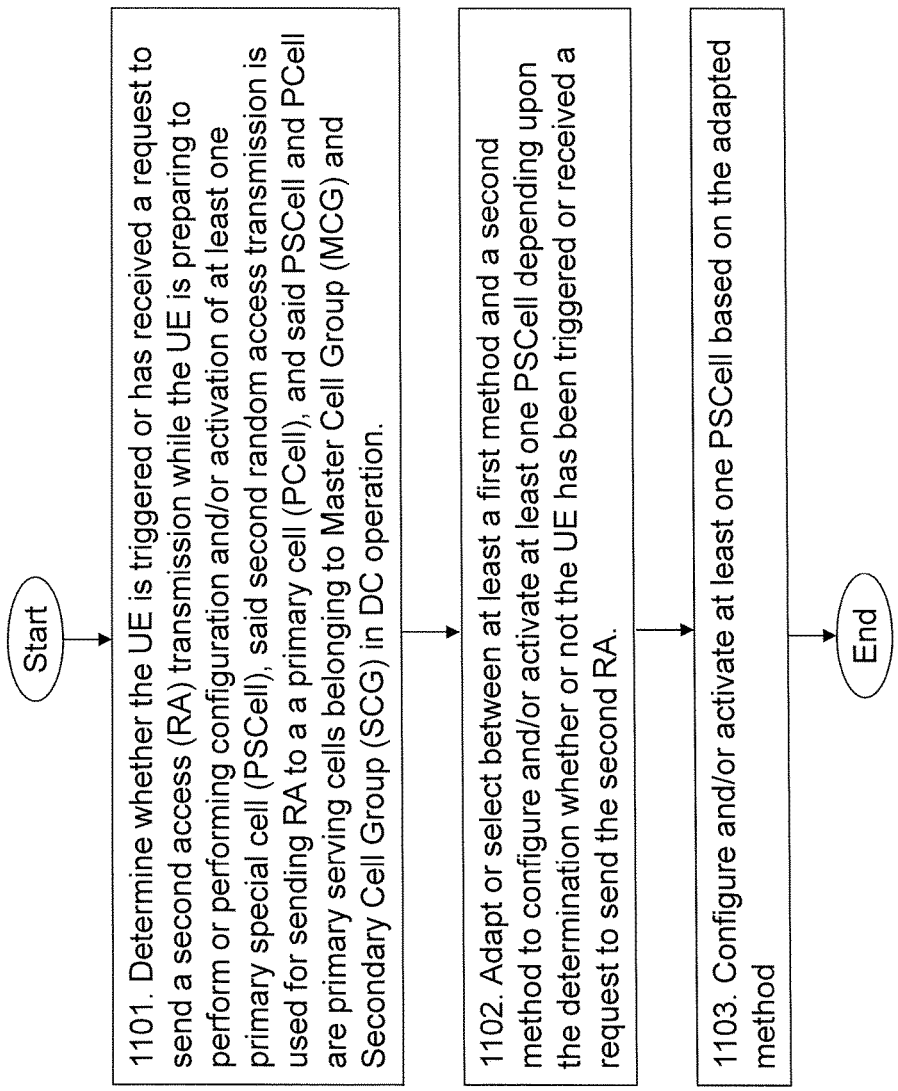
FIG. 11 is a flowchart depicting embodiments of a method performed by a wireless device.

FIG. 11 schematically illustrates another example of a method performed by a UE. A method in a UE, such as the wireless device 120, served by the network node, such as the network node 111,112, may comprise the actions of:

determining (1101) whether the UE is triggered or has received a request to send a second Random Access (RA) transmission while the UE is preparing to perform or is performing configuration and/or activation of at least one primary special cell (PSCell), said second random access transmission is used for sending the RA to a primary cell (PCell), and said PSCell and PCell are primary serving cells belonging to Master or Main Cell Group (MCG) and Secondary Cell Group (SCG) in DC operation. This action may be performed by a determining module within the UE, such as the wireless device 120.

adapting or selecting (1102) between at least a first method and a second method to configure and/or activate at least one PSCell depending upon the determination that whether or not the UE has been triggered or received the request to send the second RA. This action may be performed by an adapting or selecting module within the UE, such as the wireless device 120.

configuring and/or activating (1103) at least one PSCell based on the adapted method. This action may be performed by a configuring and/or activating module within the UE, such as the wireless device 120.

Figure 12:
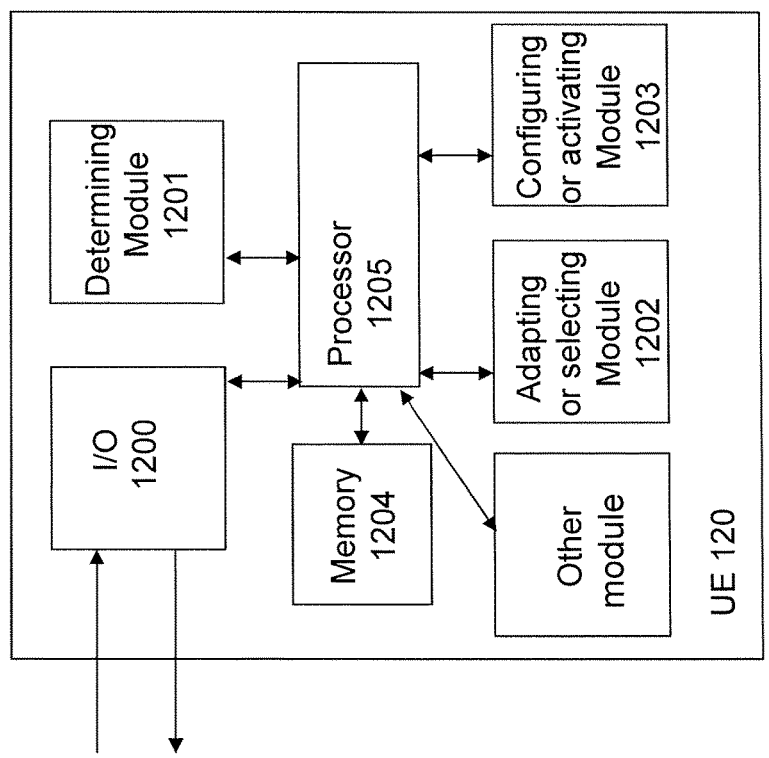
FIG. 12 is a schematic block diagram illustrating embodiments of a wireless device.

To perform the method for performing cell configuration, the wireless device 120 may be configured according to an arrangement depicted in FIG. 12. As previously described, the wireless device 120 and the first network node 111 configured to serve the wireless device 120 are configured to operate in the wireless communications network 100. Further, the first network node 111 is configured to manage the first serving cell 111a.

The UE, e.g. the wireless device 120, may comprise an interface unit to facilitate communications between the wireless device 120 and other nodes or devices, e.g. the network node 111,112. The interface may, for example, include a transceiver configured to transmit and receive radio signals over an air interface in accordance with a suitable standard. In some embodiments, the wireless device 120 comprises an input and/or output interface 1200 configured to communicate with one or more network nodes, e.g. the first and second network nodes 111, 112. The input and/or output interface 1200 may comprise a wireless receiver (not shown) and a wireless transmitter (not shown). Thus, the wireless device 120 is configured to receive signals, data or information from the one or more network nodes, e.g. the first and second network nodes 111, 112. Further, the wireless device 120 is configured to transmit signals, data or information to the one or more network nodes, e.g. the first and second network nodes 111, 112.

In some embodiments, the wireless device 120 is configured to transmit the second RA transmission to the first network node 111.

For example, when K is equal to or larger than 1, the wireless device 120 is configured to transmit the second RA transmission with priority over transmittal of the first RA transmission.

In some embodiments, the wireless device 120 is configured to transmit the second RA transmission using a non-contention based Physical Radio Access Channel (PRACH).

The wireless device 120 may further be configured to transmit the second RA transmission when required to be transmitted for performing or enabling one or more of: a positioning measurement, a timing advance measurement, an activation, an incoming call, a handover, and a cell change acquisition of uplink transmit timing.

In some embodiments, the wireless device 120 is configured to transmit the second RA transmission in dependence of a target configuration delay time for the configuration of the second serving cell 112a.

The wireless device 120 may further be configured to determine, by means of a determining module 1201 configured to determine, whether the wireless device 120 is required to send a second RA transmission. The determining module 1201 may be implemented by or arranged in communication with a processor 1205 of the wireless device 120. The processor 1205 will be described in more detail below.

In some embodiments, the wireless device 120 is configured to determine whether the wireless device 120 is required to send the second RA transmission in the first serving cell 111a to the first network node 111 while performing configuration of the second serving cell 112a.

The wireless device 120 may be configured to select, by means of a selecting module 1202 configured to select, configuration time delay. The selecting module 1202 may be implemented by or arranged in communication with the processor 1205 of the wireless device 120.

In some embodiments, when the wireless device 120 is configured to determine whether the wireless device 120 is required to send the second RA transmission in the first serving cell 111a to the first network node 111 while performing configuration of the second serving cell 112a, the wireless device 120 is further configured to select between including and excluding the time delay $T_{RA\_PCell}$ due to the second RA transmission in the configuration time delay $T_{act\_PSCell}$ based on the determination.

As previously mentioned, when used herein, the expression "including and excluding the time delay $T_{RA\_PCell}$ in the configuration time delay $T_{act\_PSCell}$" should be understood as whether or not the time delay $T_{RA\_PCell}$ is to be comprised in the configuration time delay $T_{act\_PSCell}$. It should be understood that irrespective of whether or not the time delay $T_{RA\_PCell}$ is comprised in the configuration time delay $T_{act\_PSCell}$, the configuration time delay $T_{act\_PSCell}$ may comprise one or more other time delays.

In some embodiments, the wireless device 120 is configured to select between including and excluding the time delay $T_{RA\_PCell}$ due to the second RA transmission by further being configured to select to exclude the time delay $T_{RA\_PCell}$ due to the second RA transmission when the wireless device 120 is not required to send the second RA transmission to the first network node 111 while the wireless device 120 is preparing to perform or is performing configuration of the second serving cell 112a.

In some embodiments, when the wireless device 120 is configured to select to exclude the time delay $T_{RA\_PCell}$ due to the second RA transmission, the configuration time delay $T_{act\_PSCell}$ is expressed as:

$$T_{act\_PSCell} = \alpha + T_{RRC} + T_{act} + T_{SFNacq} + T_{RA\_PSCell},$$

wherein $\alpha$ is a margin parameter, $T_{RRC}$ is a time delay due to a RRC procedure, $T_{act}$ is a time delay due to a second serving cell activation procedure, $T_{SFNacq}$ is a time delay due to a SFN acquisition procedure and $T_{RA\_PSCell}$ is a time delay due to a first RA transmission in the second serving cell 112a managed by the second network node 112.

Alternatively, in some embodiments, the wireless device 120 is configured to select between including and excluding the time delay $T_{RA\_Peed}$ due to the second RA transmission by further being configured to select to include the time delay $T_{RA\_PCell}$ due to the second RA transmission when the wireless device 120 is to send the second RA transmission to the first network node 111 while the wireless device 120 is preparing to perform or is performing configuration of the second serving cell 112a.

In some embodiments, when the wireless device 120 is configured to select include the time delay $T_{RA\_PCell}$ due to the second RA transmission, the configuration time delay $T_{act\_PSCell}$ is expressed as:

$$T_{act\_PSCell}\beta + T_{RRC} + T_{act} + T_{SFNacq} + T_{RA\_PSCell} + T_{RA\_PCell}*K,$$

wherein β is a margin parameter, $T_{RRC}$ is a time delay due to a RRC procedure, $T_{act}$ is a time delay due to a second serving cell activation procedure, $T_{SFNacq}$ is a time delay for a SFN acquisition procedure, $T_{RA\_PSCell}$ is a time delay due to the first RA transmission, $T_{RA\_PCell}$ is a time delay due to the second RA transmission and K is an integer defining the number of the second RA transmissions to be sent while the wireless device 120 is preparing to perform or is performing configuration of the second serving cell 112a.

The wireless device 120 is configured to configure, by means of a configuring module 1203 configured to configure, the second serving cell 112a as follows. The configuring module 1203 may be implemented by or arranged in communication with the processor 1205 of the wireless device 120.

When the wireless device 120 is to send the second RA transmission in the first serving cell 111a to the first network node 111 while preparing to perform or performing configuration of the second serving cell 112a managed by the second network node 112, the wireless device 120 is configured to configure the second serving cell 112a using a configuration time delay $T_{act\_PSCell}$ comprising at least a time delay $T_{RA\_PCell}$ due to the second RA transmission, otherwise the wireless device 120 is configured configure the second serving cell 112a using the configuration time delay $T_{act\_PSCell}$ excluding the time delay $T_{RA\_PCell}$ due to the second RA transmission.

In some embodiments, the configuration delay $T_{act\_PSCell}$ further comprises a time delay $T_{RA\_PSCell}$ due to a first RA transmission in the second serving cell 112a managed by the second network node 112.

In some embodiments, when the wireless device 120 is configured to determine whether the wireless device 120 is required to send the second RA transmission and configured to select between including and excluding the time delay $T_{RA\_PCell}$ due to the second RA transmission, the wireless device 120 is configured to configure the second serving cell 112a based on the selection.

The wireless device 120 may also comprise means for storing data. In some embodiments, the wireless device 120 comprises a memory 1204 configured to store the data. The data may be processed or non-processed data and/or information relating thereto. The memory 1204 may comprise one or more memory units. Further, the memory 1204 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in wireless device 120.

Embodiments herein for performing cell configuration may be implemented through one or more processors, such as the processor 1205 in the arrangement depicted in FIG. 12, together with computer program code for performing the functions and/or method actions of embodiments herein. The program code mentioned above may also be provided as a computer program product, for instance in the form of a data carrier carrying computer program code for performing the embodiments herein when being loaded into the wireless device 120. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the wireless device 120.

Those skilled in the art will also appreciate that the input/output interface 1200, the determining module 1201, the selecting module 1202, and the configuring module 1203 above may refer to a combination of analog and digital circuits, and/or one or more processors configured with software and/or firmware, e.g. stored in the memory 1204, that when executed by the one or more processors such as the processors in the wireless device 120 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

An example of a method performed by the first network node 111 for assisting a wireless device 120 in performing cell configuration will now be described with reference to a flowchart depicted in FIG. 13. As previously mentioned, the wireless device 120 and the first network node 111 serving the wireless device 120 are operating in the wireless communications network 100, and the first network node 111 manages the first serving cell 111a.

The method comprises one or more of the following actions. It should be understood that actions may be taken in any suitable order and that some actions may be combined.

Action 1301

The first network node 111 determines based on one or more criteria whether the wireless device 120 is using or is expected to use a first method or a second method for performing configuration of a second serving cell 112a managed by a second network node 112.

This may also be expressed as the first network node 111 determines based on one or more criteria out of at least a first method and a second method for use by a UE, e.g. the wireless device 120, to configure and/or activate at least one PSCell, e.g. the second serving cell 112a. As will be described below, this action may be performed by a determining module within the network node such as the first network node 111

The first method is configured to be performed over a configuration time delay $T_{act\_PSCell}$ comprising at least a time delay $T_{RA\_PCell}$ due to a second RA transmission, when the wireless device 120 is to send the second RA transmission in the first serving cell 111a to the first network node 111 while preparing to perform or performing configuration of the second serving cell 112a.

The second method is configured to be performed over the configuration time delay $T_{RA\_PSCell}$ excluding the time delay $T_{RA\_PCell}$ due to the second RA transmission, when the wireless device 120 is not to send the second RA transmission in the first serving cell 111a while preparing to perform or performing configuration of the second serving cell 112a.

In some embodiments, the configuration time delay $T_{act\_PSCell}$ further comprises a time delay $T_{RA\_PSCell}$ due to a first RA transmission in the second serving cell 112a managed by the second network node 112.

Action 1302

The first network node 111 transmits, to the wireless device 120, information relating to the determined first or second method.

Thus, the first network node 111 may transmit to the UE, e.g. the wireless device 120, information related to the determined method and/or at least one parameter related to the to the determined method. As will be described below, this action may be performed by a transmitting module within the network node such as the first network node 111.

In some embodiments, the information comprises one or more of: a parameter K defining the number of the second RA transmissions to be sent while the wireless device 120 is preparing to perform or is performing configuration of the second serving cell 112a; an indication whether or not the wireless device 120 is allowed to transmit the second RA transmission in the first serving cell 111a while preparing to perform or performing configuration of the second serving cell 112a; and a maximum allowed delay to perform the cell configuration.

Figure 14:
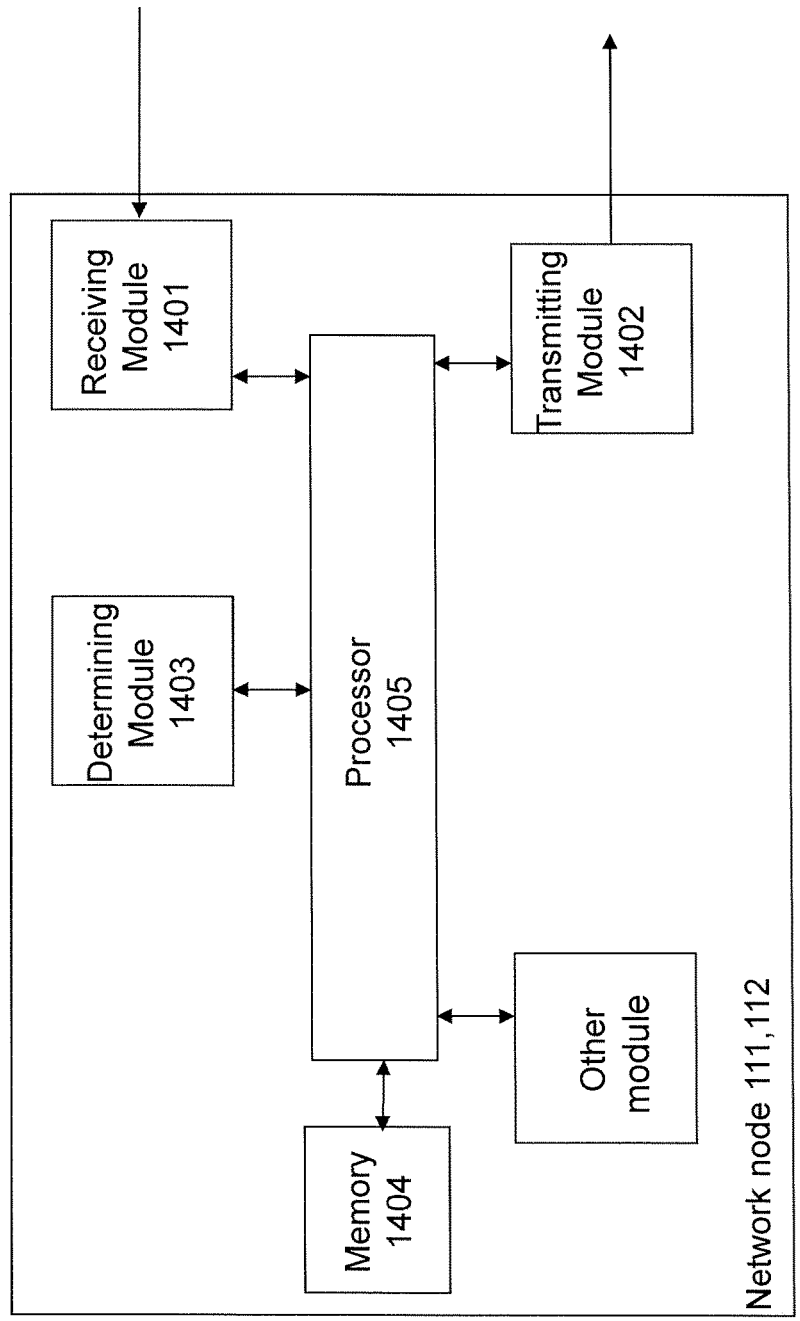
FIG. 14 is a schematic block diagram illustrating embodiments of a network node.

To perform the method for assisting the wireless device 120 in performing cell configuration, the first network node 111 may be configured according to an arrangement depicted in FIG. 14. As previously described, the wireless device 120 and the first network node 111 configured to serve the wireless device 120 are configured to operate in the wireless communications network 100. Further, the first network node 111 is configured to manage the first serving cell 111a.

The network node, e.g. the first network node 111, may comprise an interface unit to facilitate communications between the network node and other nodes or devices, e.g. UE's such as the wireless device 120. The interface may, for example, include a transceiver configured to transmit and receive radio signals over an air interface in accordance with a suitable standard.

In some embodiments, the first network node 111 is configured to receive, e.g. by means of a receiving module 1401 configured to receive, transmission from the wireless device 120. The receiving module 1401 may comprise a wireless receiver.

The first network node 111 is configured to transmit, e.g. by means of a transmitting module 1402 configured to transmit, to the wireless device 120, information relating to the determined first or second method. The transmitting module 1402 may comprise a wireless transmitter.

In some embodiments, the information comprises one or more of: a parameter K defining the number of the second RA transmissions to be sent while the wireless device 120 is preparing to perform or is performing configuration of the second serving cell 112a; an indication whether or not the wireless device 120 is allowed to transmit the second RA transmission in the first serving cell 111a while preparing to perform or performing configuration of the second serving cell 112a; and a maximum allowed delay to perform the cell configuration.

The first network node 111 is configured to determine, by means of a determining module 1403 configured to determine, a method used by or expected to be used by the wireless device 120 when performing cell configuration. The determining module 1403 may be implemented by or arranged in communication with a processor 1405 of the first network node 111. The processor 1405 will be described in more detail below.

The first network node 111 is configured to determine based on one or more criteria whether the wireless device 120 is using or is expected to use a first method or a 20 second method for performing configuration of a second serving cell 112a managed by a second network node 112.

As previously mentioned, the first method is configured to be performed over a configuration time delay $T_{act\_PSCell}$ comprising at least a time delay $T_{RA\_PCell}$ due to a second Random Access, RA, transmission, when the wireless device 120 is to send the second RA transmission in the first serving cell 111a to the first network node 111 while preparing to perform or performing configuration of the second serving cell 112a.

As also previously mentioned, the second method is configured to be performed over the configuration time delay $T_{act\_PSCell}$ excluding the time delay $T_{RA\_PCell}$ due to the second RA transmission, when the wireless device 120 is not to send the second RA transmission in the first serving cell 111a while preparing to perform or performing configuration of the second serving cell 112a.

In some embodiments, the configuration time delay $T_{act\_PSCell}$ further comprises a time delay $T_{RA\_PSCell}$ due to a first RA transmission in the second serving cell 112a managed by the second network node 112.

Embodiments herein for assisting a wireless device 120 in performing cell configuration may be implemented through one or more processors, such as the processor 1405 in the arrangement depicted in FIG. 14, together with computer program code for performing the functions and/or method actions of embodiments herein. The program code mentioned above may also be provided as a computer program product, for instance in the form of a data carrier carrying computer program code for performing the embodiments herein when being loaded into the first network node 111. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the first network node 111.

Those skilled in the art will also appreciate that receiving module 1401, the transmitting module 1402, and the determining module 1403 above may refer to a combination of analog and digital circuits, and/or one or more processors configured with software and/or firmware, e.g. stored in the memory 1404, that when executed by the one or more processors such as the processors in the first network node 111 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Exemplifying Embodiments

A method in the UE, e.g. the wireless device 120, of adapting PSCell configuration and/or activation procedure will now be described.

General Description of Adaptive Method

This embodiment discloses a method in a UE, e.g. the wireless device 120, of adapting a procedure for performing PSCell, e.g. the second serving cell 112a, configuration and/or activation depending upon whether the UE has been triggered to send random access on the PCell, e.g. the first serving cell 111a, and at least one PSCell, e.g. the second serving cell 112a. More specifically the UE, e.g. the wireless device 120:

Uses a first method (aka first PSCell configuration and/or activation method) to perform PSCell configuration and/or activation provided that the UE is not triggered to simultaneously perform random access (RA) on PCell (aka a first RA) and RA on at least one PSCell (aka a second RA);

Uses a second method (aka second PSCell configuration and/or activation method) to perform PSCell configuration and/or activation provided that the UE is triggered to simultaneously perform random access on PCell (i.e. first RA) and RA on at least one PSCell (i.e. second RA).

Some actions that may be performed in the UE, e.g. the wireless device 120, are as follows:

Determining that the UE is required to configure and/or activate at least one PSCell.

Determining whether the UE is triggered or has received a request to send a second RA (i.e. RA to PCell) while the UE is preparing to perform or performing configuration and/or activation of the at least one PSCell. This relates to Actions 1001 and 1101 previously described.

Adapting a method to configure and/or activate at least one PSCell depending upon the determination that whether or not the UE has been triggered or received send to send the second RA e.g. adapting between the first and the second methods. This relates to Actions 1002 and 1102 previously described.

Configuring and/or activating at least one PSCell based on the adapted method. This relates to Actions 1003 and 1103 previously described.

Some differences between the two methods are that:

The first method includes the time or delay due to RA transmission to at least one PSCell (i.e. no delay due to RA to PCell is included), and The second method includes the times or delays due to: RA transmission to at least one PSCell and one or more RA transmissions to the PCell. Therefore the second method involves additional delay due to at least one attempt of the second RA, The use of the second method enables the UE to perform PSCell configuration and/or activation, which requires first RA as well execute procedures which require the second RA. Therefore all procedures may be executed.

It is further described with specific examples below, that both methods may comprise additional delay components to account for the delay caused by other procedures such as RRC procedure etc.

The term 'simultaneous triggering', when used herein, means a situation in which the UE, e.g. the wireless device 120, may be triggered at the same time, or within certain time period or when at least one random access is in progress, to perform random access on the PCell, e.g. the first serving cell 111*a*, and the at least one PSCell, e.g. the second serving cell 112*a*. This is explained with few exampled below:

In one example, the UE may receive the requests at exactly the same time to send random access on PCell and at least one PSCell.

In another example, the UE may receive two requests at different times but within a time window (e.g. 5 subframes) while UE has not yet starting sending the first random access based on the first request.

In another example the UE may receive two requests at different times such that the second request is received when UE has already started sending the first random access based on the first request/trigger.

The UE, e.g. the wireless device 120, may be triggered for sending random access by a request received at the UE's physical layer from the UE's higher layer e.g. MAC layer protocol.

The term PSCell configuration means when the UE has at least acquired timing information of the PSCell e.g. synchronized to PSCell, acquired its SFN etc.

The term PSCell activation means when the UE has acquired timing information of the PSCell and is also able to receive signals from the PSCell e.g. downlink control channel such as PDCCH, data channel such as PDSCH etc.

Examples of Adaptive PSCell Configuration and/or Activation Procedure

This section comprises some specific examples of adaptive PSCell configuration and/or activation procedure.

As an example:

The first method to perform PSCell configuration and/or activation comprises the following individual procedures performed by the UE, e.g. the wireless device 120:

RRC procedure to process the received message containing PSCell configuration and/or activation command;

Procedure to acquire System Frame Number (SFN) of the PSCell;

Activation procedure for PSCell;

Random Access (RA) procedure to send the first RA i.e. RA to access PSCell.

The second method to perform PSCell configuration and/or activation comprises the following individual procedures performed by the UE, e.g. the wireless device 120:

RRC procedure to process the received message containing PSCell configuration and/or activation command;

Procedure to acquire system frame number (SFN) of the PSCell;

Activation procedure for PSCell;

Random access (RA) procedure to send the first RA i.e. RA to access PSCell;

Random access (RA) procedure to send the second RA i.e. at least one RA to access PCell;

In the above example the time to perform various procedures are represented as follows:

RRC procedure delay as $T_{RRC}$;

PSCell activation procedure delay as $T_{act}$;

SFN acquisition procedure delay as $T_{SFNacq}$

First RA procedure delay as $T_{RA\_PSCell}$

Second RA procedure delay as $T_{RA\_PCell}$

The total time or delay to perform PSCell configuration and/or activation using the first method may be expressed by the following general expression:

$$T_{act\_pscell\_first\_method} = g(\alpha, T_{RRC}, T_{act}, T_{SFNacq}, T_{RA\_PSCell}) \quad (1)$$

The total time in equation (1) may also be expressed using the following specific expression:

$$T_{act\_pscell\_first\_method} = \alpha + T_{RRC} + T_{act} + T_{SFNacq} + T_{RA\_PSCell} \quad (2)$$

In equations (1) and (2), the parameter 'a' may account for a margin. As a special case α=0, for example if no extra margin is needed or if it is included in other parameter.

The total time or delay to perform PSCell configuration and/or activation using the second method may be expressed by the following general expression:

$$T_{act\_pscell\_second\_method} = g(\beta, T_{RRC}, T_{act}, T_{SFNacq}, T_{RA\_PSCell}, K) \quad (3)$$

The total time in equation (3) may also be expressed using the following specific expression:

$$T_{act\_pscell\_second\_method} = \beta + T_{RRC} + T_{act} + T_{SFNacq} + T_{RA\_PSCell} + T_{RA\_PCell} * K \quad (4)$$

In equations (3)-(4) the parameter K is an integer and denotes the number of attempted PCell PRACH transmissions, i.e. the number of second RA transmissions. The parameter K may be pre-defined, configured by the network node, e.g. the first network node 111, or may be autonomously selected by the UE, e.g. the wireless device 120. As a special case K=1 i.e. only one attempt to send the second RA to the PCell, e.g. the first serving cell 111a, while the PSCell, e.g. the second serving cell 112a, is being configured and/or activated. The use of the parameter K will be further described below.

In equations (3) and (4), the parameter '13' may account for a margin. As a special case β=0, for example if no extra margin is needed or if it is included in other parameter.

The expression in equation (4) enables the UE, i.e. when applying the second method, to first transmit the second RA to the PCell, e.g. the first serving cell 111a, up to K times (depending on value of K) before sending the second RA to the PSCell, second serving cell 112a. Therefore the UE, e.g. the wireless device 120, performs the two types of RA in tandem.

In any of the above expressions (1)-(4) any parameter other than $T_{RA\_PSCell}$ and $T_{RA\_PCell}$ may be set to zero. For example if UE knows the SFN of the PSCell then $T_{SFNacq}=0$.

In equations (1)-(4) the typical values of different procedures are described below:

Typically the RRC procedure delay is about 15 ms.

The PSCell activation delay is in the order of 20 ms and 30 ms if the PSCell, e.g. the second serving cell 112a, is known and unknown respectively. A PSCell is considered known if the UE, e.g. the wireless device 120, is synchronized to the PSCell. More specifically the PSCell is known if the UE has measured the PSCell over the last certain time period; otherwise it is considered unknown.

The SFN acquisition procedure for acquiring SFN of PSCell may take about 50 ms. If the UE already knows the SFN then this time may be much shorter or even set to 0 ms. For example if the network node signals SFN of the PSCell then $T_{SFNacq}=0$ or equal to a smaller value such as $T_{SFNacq}=10$ ms due to frame timing uncertainty.

Each of the first and second RA procedures may require 20-50 ms depending upon the configuration of the random access parameters e.g. RA occasions, number of allowed retransmission attempts etc.

The adaptive procedure to perform PSCell configuration and/or activation based on equation (3) and (4) may be expressed as follows:

When the PSCell, e.g. the second serving cell 112a, is being configured and/or activated, if the UE, e.g. the wireless device 120, is not triggered perform simultaneous PRACH transmissions to the PCell, e.g. the first serving cell 111a, and to the PSCell, e.g. the second serving cell 112a, then the required activation/configuration time for PSCell will be according to the following expression based on the first method:

$$T_{act\_pscell} = \alpha + T_{RRC} + T_{act} + T_{SFNacq} + T_{RA\_PSCell}$$

If there are situations when the UE, e.g. the wireless device 120, is triggered to perform simultaneous PRACH transmissions to both the PCell, e.g. the first serving cell 111a, and the PSCell, e.g. the second serving cell 112a, then the activation/configuration time required for PSCell will be according to the following expression based on the second method:

$$T_{act\_pscell} = T_{RRC} + T_{act} + T_{SFNacq} + T_{RA\_PSCell} T_{RA\_PCell} * K$$

The K may also have a default value e.g. K=1. That is when only certain number of second RA transmissions while the PSCell, e.g. the second serving cell 112a, is configured and/or activated is pre-defined.

The chosen value of K, which is an integer, gives rise to different rules or schemes, which are described in the coming sections.

Method of Prioritizing Between PSCell and PCell PRACH Transmissions

In some embodiments, the UE, e.g. the wireless device 120, may be triggered to use one of the following rules while configuring and/or activating the PSCell, e.g. the second serving cell 112a:

1 Discard the second RA transmission if it occurs while the PSCell is being configured and/or activated i.e. K=0;
2 Prioritize the second RA transmission over the first RA transmission i.e. K≥1;
3 Prioritize the second RA transmission over the first RA transmission for up to certain number of the second RA transmissions, and discard beyond that number i.e. 1≤K≤m. The value of m may be pre-defined, configured by the network node, e.g. the first network node 111, or selected by the UE, e.g. the wireless device 120, autonomously.

The UE, e.g. the wireless device 120, may be triggered to configure and/or activate the PSCell, e.g. the second serving cell 112a, according to any of above principle based on:
Pre-defined rule;
Information received from the network node, e.g. the first network node 111a, e.g. value of K is signalled;
UE autonomously selection e.g. UE selects the value of K
In case of autonomous selection of the rule, the UE, e.g. the wireless device 120, may also inform the network node, e.g. the first network node 111, as to which of the rule has been used by the UE e.g. have set K=0 as in rule #1.

Furthermore, the one or more criterions may be used to define which of the above rules is to be used by the UE in case both the first and the second RA are triggered by the UE during the PSCell configuration and/or activation procedure.

As an example embodiment, the UE may autonomously set K=0, i.e. apply rule #1 above, based on certain criterion. Several examples of criteria for selecting the rule are described below.

Prioritization Based on Whether RACH is Contention Based on Non-Contention Based In one aspect of some embodiments, the UE, e.g. the wireless device 120, may transmit PRACH to the PCell, e.g. the first serving cell 111a, only if the PRACH is non-contention based. For example, the UE may use the second method, e.g. expressions (3)-(4); if the UE is triggered to send the second RA using non-contention based principle e.g. for performing handover. Therefore, UE may use rule #1 or rule #2. In case of rule #2 the UE may also use certain maximum value of K e.g. K=4.

Prioritization Based on Purpose of PRACH to PCell.

In another aspect of some embodiments, the UE, e.g. the wireless device 120, may transmit PRACH to the PCell, e.g. the first serving cell 111a, depending on the purpose of the RACH. For example, the UE may send the PRACH to the PCell only when the PRACH is triggered to be transmitted for certain tasks or purposes. Examples of use cases of RA are for: positing measurement, timing advance, activation, incoming call, handover, cell change, acquisition of UL transmit timing, etc.

For example for certain critical tasks, e.g. second RA transmission for doing or enabling positioning measurements and/or handover; it may be pre-defined that the UE shall use at least rule #2 or UE may be configured to use rule #2 by the network node, e.g. the first network node 111.

Target Delay of PSCell Configuration and/or Activation Procedure

In another aspect of some embodiments, the UE, e.g. the wireless device 120, may be required to transmit PRACH to the PCell, e.g. the first serving cell 111a, depending on the target delay of the PSCell configuration and/or activation procedure. For example, the maximum allowed delay may be pre-defined or configured by the network node, e.g. the first network node 111.

If the UE cannot perform the PSCell configuration and/or activation procedure with the target delay, then the UE may set K=0. Otherwise, the UE may choose the maximum value of K provided the PSCell configuration and/or activation procedure can be done within the target delay.

Figure 13:
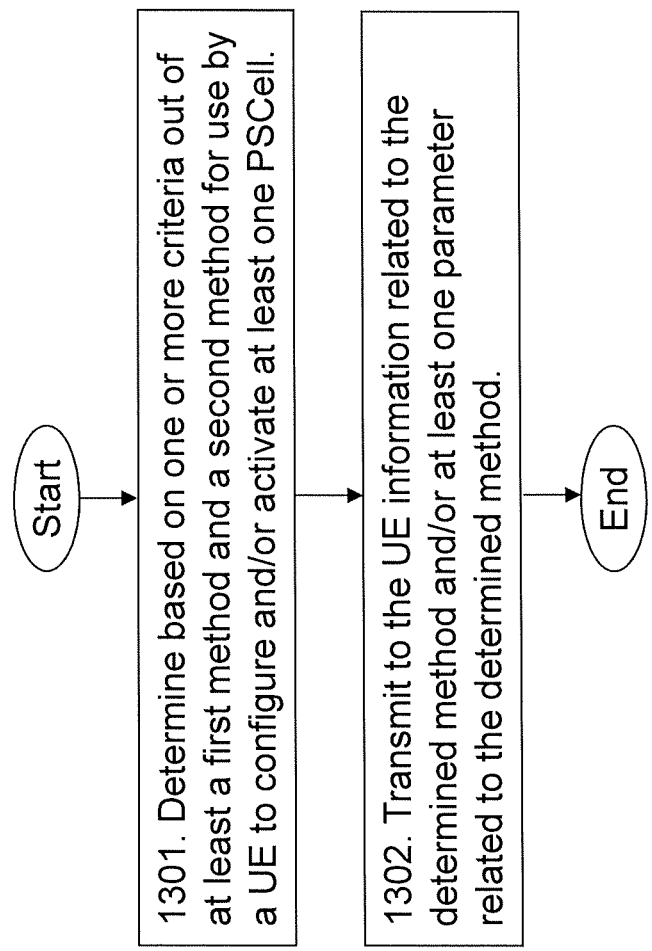
FIG. 13 is a flowchart depicting embodiments of a method performed by a network node.

As previously described, the embodiments herein may be implemented through one or more processors, such as a processor in the UE 120 depicted in FIG. 11, and a processor in the network node 111,112 depicted in FIG. 13, together with computer program code for performing the functions and actions of the embodiments herein. The program code mentioned above may also be provided as a computer program product, for instance in the form of a data carrier carrying computer program code for performing the embodiments herein when being loaded into the in the network node 111,112 or the UE 120. One such carrier may be in the form of a CD ROM disc. It is however feasible with other data carriers such as a memory stick. The computer program code may furthermore be provided as pure program code on a server and downloaded to the network node 111,112 or the UE 120.

The network node 111,112 and the UE 120 may further comprise a memory comprising one or more memory units. The memory is arranged to be used to store obtained information, store data, configurations, scheduling, and applications etc. to perform the methods herein when being executed in the network node 111,112 or the UE 120.

Those skilled in the art will also appreciate that the determining module, adapting module, selecting module, configuring module, activating module, transmitting module, receiving module, sending module and performing module described above may refer to a combination of analog and digital circuits, and/or one or more processors configured with software and/or firmware, e.g. stored in the memory, that when executed by the one or more processors such as the processors in the network node 111,112 and UE 120 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

When the word "comprise" or "comprising" is used in this disclosure it shall be interpreted as non-limiting, i.e. meaning "consist at least of".

The embodiments herein are not limited to the above described preferred embodiments. Various alternatives, modifications and equivalents may be used.

Therefore, the above embodiments should not be taken as limiting the scope of the invention, which is defined by the appending claims.

ABBREVIATIONS

MeNB Master eNode B
SeNB Secondary eNode B
PSCell Primary SCell
PCC Primary component carrier
PCI Physical cell identity
PSS Primary synchronization signal
RAT Radio Access Technology
RRC Radio resource control
RSCP Received signal code power
RSRP Reference Signal Received Power
RSRQ Reference Signal Received Quality
RSSI Received signal strength indication
SCC Secondary component carrier
SIB System information block
SON Self-organizing networks
SSS Secondary synchronization signal
TDD Time division duplex
UARFCN UMTS Absolute Radio Frequency Channel Number
HO Handover
UE User equipment
RNC Radio Network Controller
BSC Base station Controller
PCell Primary Cell
SCell Secondary Cell

The invention claimed is:

1. A method performed by a wireless device for performing cell configuration, wherein the wireless device and a first network node serving the wireless device are operating in a wireless communications network, wherein the first network node manages a first serving cell, and wherein the method comprises:

when the wireless device is to send a Random Access (RA) transmission in the first serving cell to the first network node while preparing to perform or performing configuration of a second serving cell managed by a second network node, configuring the second serving cell within a first configuration time delay comprising at least a first time delay (TRA_PCell) due to the RA transmission in the first serving cell;

otherwise configuring the second serving cell within a second configuration time delay that does not include the first time delay.

2. The method of claim 1, wherein the first configuration time delay further comprises a second time delay (TRA_PSCell) due to a RA transmission in the second serving cell managed by the second network node.

3. The method of claim 1, further comprising:

determining whether the wireless device is required to send the RA transmission in the first serving cell to the first network node while performing configuration of the second serving cell;

selecting one of the first configuration time delay and the second configuration time delay based on the determination; and configuring the second serving cell based on the selection.

4. The method of claim 3, wherein selecting one of the first configuration time delay and the second configuration time delay based on the determination comprises:

selecting the second configuration time delay as a result of determining that the wireless device is not required to send the RA transmission in the first serving cell to the first network node while the wireless device is preparing to perform or is performing configuration of the second serving cell.

5. The method of claim 4, wherein the second configuration time delay is expressed as:

$$Tact\_PSCell=\alpha+TRRC+Tact+TSFNacq+TRA\_PSCell,$$

wherein α is a margin parameter, TRRC is a time delay due to a Radio Resource Control RRC, procedure, Tact is a time delay due to a second serving cell activation procedure, TSFNacq is a time delay due to a System Frame Number, SFN, acquisition procedure and TRA_PSCell is a time delay due to the RA transmission in the second serving cell managed by the second network node.

6. The method of claim 3, wherein selecting one of the first configuration time delay and the second configuration time delay based on the determination comprises:
selecting the first configuration time delay as a result of determining that the wireless device is to send the RA transmission in the first serving cell to the first network node while the wireless device is preparing to perform or is performing configuration of the second serving cell.

7. The method of claim 6, wherein the first configuration time delay is expressed as:

$$Tact\_PSCell=\beta+TRRC+Tact+TSFNacq+TRA\_PSCell+TRA\_PCell*K,$$

wherein β is a margin parameter, TRRC is a time delay due to a RRC procedure, Tact is a time delay due to a second serving cell activation procedure, TSFNacq is a time delay due to a SFN acquisition procedure, TRA_PSCell is a time delay due to the RA transmission in the second serving cell, TRA_PCell is a time delay due to the RA transmission in the first serving cell and K is an integer defining a number of RA transmissions in the first serving cell to be sent while the wireless device is preparing to perform or is performing configuration of the second serving cell.

8. The method of claim 7, further comprising:
when K is equal to or larger than 1, transmitting the RA transmission in the first serving cell with priority over transmitting the RA transmission in the second serving cell.

9. The method of claim 6, further comprising:
transmitting the RA transmission in the first serving cell using a non-contention based Physical Radio Access Channel, PRACH.

10. The method of claim 6, further comprising:
transmitting the RA transmission in the first serving cell when required to be transmitted for performing or enabling one or more of: a positioning measurement, a timing advance measurement, an activation, an incoming call, a handover, and a cell change acquisition of uplink transmit timing.

11. The method of claim 6, further comprising:
transmitting the RA transmission in the first serving cell in dependence of a target configuration delay time for the configuration of the second serving cell.

12. A computer program product comprising non-transitory computer readable storage medium comprising a computer program comprising instructions which, when executed on at least one processor, causes the at least one processor to carry out the method according to claim 1.

13. A wireless device for performing cell configuration, wherein the wireless device and a first network node serving the wireless device are operable in a wireless communications network, wherein the first network node manages a first serving cell, the wireless device comprising:
a memory; and
a processor coupled to the memory, wherein the wireless device is configured to:
when the wireless device is to send a Random Access (RA) transmission in the first serving cell to the first network node while preparing to perform or performing configuration of a second serving cell managed by a second network node, configure the second serving cell within a first configuration time delay comprising at least a first time delay (TRA_PCell) due to the RA transmission in the first serving cell;
otherwise configuring the second serving cell within a second configuration time delay that does not include the first time delay.

14. The wireless device of claim 13, wherein the first configuration time delay further comprises a second time delay (TRA_PSCell) due to a RA transmission in the second serving cell managed by the second network node.

15. The wireless device of claim 13, further being configured to:
determine whether the wireless device is required to send the RA transmission in the first serving cell to the first network node while performing configuration of the second serving cell;
select one of the first configuration time delay and the second configuration time delay based on the determination; and
configure the second serving cell based on the selection.

16. The wireless device of claim 15, wherein the wireless device is configured to select one of the first configuration time delay and the second configuration time delay based on the determination by performing a procedure comprising:
selecting the second configuration time delay as a result of determining that the wireless device is not required to send the RA transmission in the first serving cell to the first network node while the wireless device is preparing to perform or is performing configuration of the second serving cell.

17. The wireless device of claim 16, wherein the second configuration time delay is expressed as:

$$Tact\_PSCell=\alpha+TRRC+Tact+TSFNacq+TRA\_PSCell,$$

wherein α is a margin parameter, TRRC is a time delay due to a Radio Resource Control RRC, procedure, Tact is a time delay due to a second serving cell activation procedure, TSFNacq is a time delay due to a System Frame Number, SFN, acquisition procedure and TRA_PSCell is a time delay due to the RA transmission in the second serving cell managed by the second network node.

18. The wireless device of claim 15, wherein the wireless device is configured to select one of the first configuration time delay and the second configuration time delay based on the determination by performing a procedure comprising:
selecting the first configuration time delay as a result of determining that the wireless device is to send the RA transmission in the first serving cell to the first network node while the wireless device is preparing to perform or is performing configuration of the second serving cell.

19. The wireless device of claim 18, wherein the first configuration time delay Tact_PSCell is expressed as:

$$Tact\_PSCell = \beta + TRRC + Tact + TSFNacq + TRA\_PSCell + TRA\_PCell * K,$$

wherein β is a margin parameter, TRRC is a time delay due to a RRC procedure, Tact is a time delay due to a second serving cell activation procedure, TSFNacq is a time delay for a SFN acquisition procedure, TRA_PSCell is a time delay due to the RA transmission in the second serving cell, TRA_PCell is a time delay due to the RA transmission in the first serving cell and K is an integer defining a number of RA transmissions in the first serving cell to be sent while the wireless device is preparing to perform or is performing configuration of the second serving cell.

20. The wireless device of claim 19, further being configured to:
when K is equal to or larger than 1, transmit the RA transmission in the first serving cell with priority over transmittal of the RA transmission in the second serving cell.

21. The wireless device of claim 18, further being configured to:
transmit the RA transmission in the first serving cell using a non-contention based Physical Radio Access Channel, PRACH.

22. The wireless device of claim 18, further being configured to:
transmit the RA transmission in the first serving cell when required to be transmitted for performing or enabling one or more of: a positioning measurement, a timing advance measurement, an activation, an incoming call, a handover, and a cell change acquisition of uplink transmit timing.

23. The wireless device of claim 18, further being configured to:
transmit the RA transmission in the first serving cell in dependence of a target configuration delay time for the configuration of the second serving cell.

24. A method performed by a first network node for assisting a wireless device in performing cell configuration, wherein the wireless device and the first network node serving the wireless device are operating in a wireless communications network, wherein the first network node manages a first serving cell, and wherein the method comprises:
determining based on one or more criteria whether the wireless device is using or is expected to use a first method or a second method for performing configuration of a second serving cell managed by a second network node,
wherein the first method is configured to be performed within a first configuration time delay comprising at least a first time delay (TRA_PCell) due to a Random Access (RA) transmission, when the wireless device is to send the RA transmission in the first serving cell to the first network node while preparing to perform or performing configuration of the second serving cell, and
wherein the second method is configured to be performed within a second configuration time delay that does not include the first time delay, when the wireless device is not to send the RA transmission in the first serving cell while preparing to perform or performing configuration of the second serving cell; and
transmitting, to the wireless device, information relating to the determined first or second method.

25. The method of claim 24, wherein the information comprises one or more of: a parameter K defining the number of the RA transmissions in the first serving cell to be sent while the wireless device is preparing to perform or is performing configuration of the second serving cell; an indication whether or not the wireless device is allowed to transmit the RA transmission in the first serving cell while preparing to perform or performing configuration of the second serving cell; and a maximum allowed delay to perform the cell configuration.

26. The method of claim 24, wherein the second configuration time delay comprises a second time delay (TRA_PSCell) due to a RA transmission in the second serving cell managed by the second network node.

27. A first network node for assisting a wireless device in performing cell configuration, wherein the wireless device and the first network node serving the wireless device are operable in a wireless communications network, wherein the first network node manages a first serving cell, the first network node comprising:
a memory; and
a processor coupled to the memory, wherein the first network node is configured to:
determine based on one or more criteria whether the wireless device is using or is expected to use a first method or a second method for performing configuration of a second serving cell managed by a second network node,
wherein the first method is configured to be performed within a first configuration time delay comprising at least a first time delay (TRA_PCell) due to a Random Access (RA) transmission, when the wireless device is to send the RA transmission in the first serving cell to the first network node while preparing to perform or performing configuration of the second serving cell, and
wherein the second method is configured to be performed within a second configuration time delay that does not include the first time delay, when the wireless device is not to send the RA transmission in the first serving cell while preparing to perform or performing configuration of the second serving cell; and
transmit, to the wireless device, information relating to the determined first or second method.

28. The first network node of claim 27, wherein the information comprises one or more of: a parameter K defining a number of RA transmissions in the first serving cell to be sent while the wireless device is preparing to perform or is performing configuration of the second serving cell; an indication whether or not the wireless device is allowed to transmit the RA transmission in the first serving cell while preparing to perform or performing configuration of the second serving cell; and a maximum allowed delay to perform the cell configuration.

29. The first network node of claim 27, wherein the second configuration time delay comprises a second time delay (TRA_PSCell) due to a RA transmission in the second serving cell managed by the second network node.

* * * * *

UNITED STATES PATENT AND TRADEMARK OFFICE
CERTIFICATE OF CORRECTION

PATENT NO. : 10,015,820 B2
APPLICATION NO. : 14/781230
DATED : July 3, 2018
INVENTOR(S) : Rahman et al.

It is certified that error appears in the above-identified patent and that said Letters Patent is hereby corrected as shown below:

In the Drawings

In Fig. 11, Drawing Sheet 11 of 14, in Step "1101", in Line 2, delete "second access" and insert -- second random access --, therefor.

In the Specification

Column 3, Line 28, delete "etc.;" and insert -- etc. --, therefor.

Column 11, Line 41, delete "wireless," and insert -- wireless device 120, --, therefor.

Column 14, Line 8, delete "embodiments." and insert -- embodiments, --, therefor.

Column 16, Line 61, delete "$T_{RA\_Peed}$" and insert -- $T_{RA\_PCell}$ --, therefor.

Column 17, Line 6, delete " $$T_{act\_PSCell}\beta + T_{RRC} + T_{act} + T_{SFNacq} + T_{RA\_PSCell} + T_{RA\_PCell} * K,$$ " and insert -- $$T_{act\_PSCell} = \beta + T_{RRC} + T_{act} + T_{SFNacq} + T_{RA\_PSCell} + T_{RA\_PCell} * K,$$ --, therefor.

Column 19, Line 28, delete "UE's" and insert -- UE --, therefor.

Column 19, Line 62, delete "a 20" and insert -- a --, therefor.

Column 21, Line 39, delete "as well" and insert -- as well as --, therefor.

Signed and Sealed this
Fourth Day of December, 2018

Andrei Iancu
*Director of the United States Patent and Trademark Office*

CERTIFICATE OF CORRECTION (continued)
U.S. Pat. No. 10,015,820 B2

Column 21, Line 52, delete "exampled" and insert -- examples --, therefor.

Column 21, Line 58, delete "starting" and insert -- started --, therefor.

Column 22, Line 59, delete "□a'" and insert -- □α' --, therefor.

Column 23, Line 17, delete "□13'" and insert -- □β' --, therefor.

Column 24, Line 6, delete "$T_{act\_pscell} = T_{RRC} + T_{act} + T_{SFNacq} + T_{RA\_PSCell} T_{RA\_PCell} * K$" and insert -- $T_{act\_pscell} = T_{RRC} + T_{act} + T_{SFNacq} + T_{RA\_PSCell} + T_{RA\_PCell} * K$ --, therefor.

Column 24, Line 37, delete "network node 111a," and insert -- network node 111, --, therefor.

In the Claims

Column 27, Line 11, Claim 5, delete "Control RRC," and insert -- Control, RRC, --, therefor.

Column 28, Line 51, Claim 17, delete "Control RRC," and insert -- Control, RRC, --, therefor.

Column 29, Line 2, Claim 19, delete "delay Tact_PSCell is" and insert -- delay is --, therefor.